US012158742B2

(12) United States Patent
Nagata et al.

(10) Patent No.: US 12,158,742 B2
(45) Date of Patent: Dec. 3, 2024

(54) DATA COLLECTION SYSTEM FOR INDUSTRIAL MACHINE, DATA COLLECTION METHOD FOR INDUSTRIAL MACHINE, AND INFORMATION STORAGE MEDIUM

(71) Applicant: Kabushiki Kaisha Yaskawa Denki, Kitakyushu (JP)

(72) Inventors: Takeshi Nagata, Kitakyushu (JP); Tomoyuki Nakamura, Kitakyushu (JP); Aya Matsunaga, Kitakyushu (JP); Shinichiro Obata, Kitakyushu (JP); Ryosuke Nishida, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 375 days.

(21) Appl. No.: 17/652,473

(22) Filed: Feb. 24, 2022

(65) Prior Publication Data

US 2022/0276630 A1    Sep. 1, 2022

(30) Foreign Application Priority Data

Feb. 26, 2021  (JP) ................................. 2021-030307

(51) Int. Cl.
*G05B 19/406* (2006.01)
*G06F 16/2455* (2019.01)

(52) U.S. Cl.
CPC ..... *G05B 19/406* (2013.01); *G06F 16/24565* (2019.01); *G05B 2219/31449* (2013.01)

(58) Field of Classification Search
CPC .............. G06F 16/24565; G06F 16/27; G05B 2219/31449; G05B 2219/31284; G05B 2219/31288; G05B 19/4183; G05B 2219/31282
See application file for complete search history.

(56) References Cited

U.S. PATENT DOCUMENTS

| 2005/0177269 A1 | 8/2005 | Funk |
| 2016/0238659 A1 | 8/2016 | Shiromoto et al. |
| 2016/0239009 A1* | 8/2016 | Mizuno .............. G05B 19/4063 |

(Continued)

FOREIGN PATENT DOCUMENTS

| JP | 2005531933 A | 10/2005 |
| JP | 2019149081 A | 9/2019 |

(Continued)

OTHER PUBLICATIONS

Office Action of Aug. 9, 2022, for corresponding JP Patent Application No. 2021-030307 with partial English translation pp. 1-3.

(Continued)

*Primary Examiner* — Mohammad Ali
*Assistant Examiner* — Dhruvkumar Patel
(74) *Attorney, Agent, or Firm* — HEA Law PLLC

(57) ABSTRACT

A data collection system for an industrial machine, the data collection system comprising circuitry configured to: collect collection data relating to the industrial machine based on a predetermined collection setting; identify the predetermined collection setting based on identification information associated with the collection data; and execute parse processing relating to the collection data based on the identified predetermined collection setting.

15 Claims, 14 Drawing Sheets

(56) References Cited

U.S. PATENT DOCUMENTS

| | | | |
|---|---|---|---|
| 2018/0059630 A1* | 3/2018 | Yang | G06F 7/08 |
| 2018/0239341 A1* | 8/2018 | Moorhouse | G05B 19/4183 |
| 2018/0246944 A1* | 8/2018 | Yelisetti | G06F 16/258 |
| 2019/0363932 A1 | 11/2019 | Nasu et al. | |
| 2020/0250069 A1 | 8/2020 | Nagata | |
| 2020/0379431 A1* | 12/2020 | Onose | G05B 19/408 |
| 2021/0318676 A1 | 10/2021 | Kashiwagi et al. | |
| 2022/0004155 A1* | 1/2022 | Kawai | G06F 7/57 |

FOREIGN PATENT DOCUMENTS

| | | | | |
|---|---|---|---|---|
| JP | 2020052441 A | * | 4/2020 | H01L 41/083 |
| JP | 2020123230 A | | 8/2020 | |
| WO | 2015068210 A1 | | 5/2015 | |
| WO | 2019087409 A1 | | 5/2019 | |
| WO | 2020136845 A1 | | 7/2020 | |

OTHER PUBLICATIONS

Search Report of Jul. 15, 2022, for corresponding EP Patent Application No. 22157725.7 pp. 1-9.

* cited by examiner

FIG.5

| MACHINE ID | TOPIC ID | SETTING NAME | FEEDBACK VARIABLE NAMES | REGISTER COLLECTION ||||| PARSER | COLLECTION DATA BEFORE PARSE PROCESSING | COLLECTION DATA AFTER PARSE PROCESSING |
||||| TRIGGER | COLLECTION TARGET VARIABLE NAMES | SCHEDULE | SAMPLING CYCLE | ... |||
|---|---|---|---|---|---|---|---|---|---|---|---|
| 1 | 1 | COLLECTION SETTINGS X | VARIABLE A_1<br>VARIABLE B_1<br>VARIABLE C_1<br>... | TRIGGER X | VARIABLE D<br>VARIABLE E<br>VARIABLE F<br>... | SCHEDULE X | CYCLE X | ... | PARSER1 | COLLECTION DATA Eq1_X1_1<br>COLLECTION DATA Eq1_X1_2<br>COLLECTION DATA Eq1_X1_3<br>... | COLLECTION DATA Eq1_X2_1<br>COLLECTION DATA Eq1_X2_2<br>COLLECTION DATA Eq1_X2_3<br>... |
| 1 | 2 | COLLECTION SETTINGS Y | VARIABLE A_2<br>VARIABLE B_2<br>VARIABLE C_2<br>... | TRIGGER Y | VARIABLE G<br>VARIABLE H<br>VARIABLE I<br>... | SCHEDULE Y | CYCLE Y | ... | PARSER2 | COLLECTION DATA Eq1_Y1_1<br>COLLECTION DATA Eq1_Y1_2<br>COLLECTION DATA Eq1_Y1_3<br>... | COLLECTION DATA Eq1_Y2_1<br>COLLECTION DATA Eq1_Y2_2<br>COLLECTION DATA Eq1_Y2_3<br>... |
| ... | ... | ... | | | | | | ... | ... | | |

DB

DATA COLLECTION SYSTEM FOR INDUSTRIAL MACHINE, DATA COLLECTION METHOD FOR INDUSTRIAL MACHINE, AND INFORMATION STORAGE MEDIUM

CROSS-REFERENCE TO RELATED APPLICATION

The present disclosure contains subject matter related to that disclosed in Japanese Priority Patent Application JP2021-030307 filed in the Japan Patent Office on Feb. 26, 2021, the entire contents of which are hereby incorporated by reference.

BACKGROUND OF THE INVENTION

1. Field of the Invention

The embodiments disclosed herein relate to a data collection system for an industrial machine, a data collection method for an industrial machine, and an information storage medium.

2. Description of the Related Art

In WO 2015/068210 A, there is described a system for tracing an operation of an industrial machine in time series based on a predetermined collection setting to collect collection data, and uploading the collection data to a cloud server. An analyst is requested to analyze the collection data uploaded from the industrial machine.

SUMMARY OF THE INVENTION

According to one aspect of the present disclosure, there is provided a data collection system for an industrial machine, the data collection system comprising circuitry configured to: collect collection data relating to the industrial machine based on a predetermined collection setting; identify the predetermined collection setting based on identification information associated with the collection data; and execute parse processing relating to the collection data based on the identified predetermined collection setting.

BRIEF DESCRIPTION OF THE DRAWINGS

FIG. 5 is a table for showing a data storage example of a database.

DESCRIPTION OF THE EMBODIMENTS

1. First Embodiment

Description is given of an example of embodiments of a data collection system according to the present disclosure. Description is now given of the data collection system according to a first embodiment of the present disclosure.

[1-1. Overall Configuration of Data Collection System]

Figure 1:
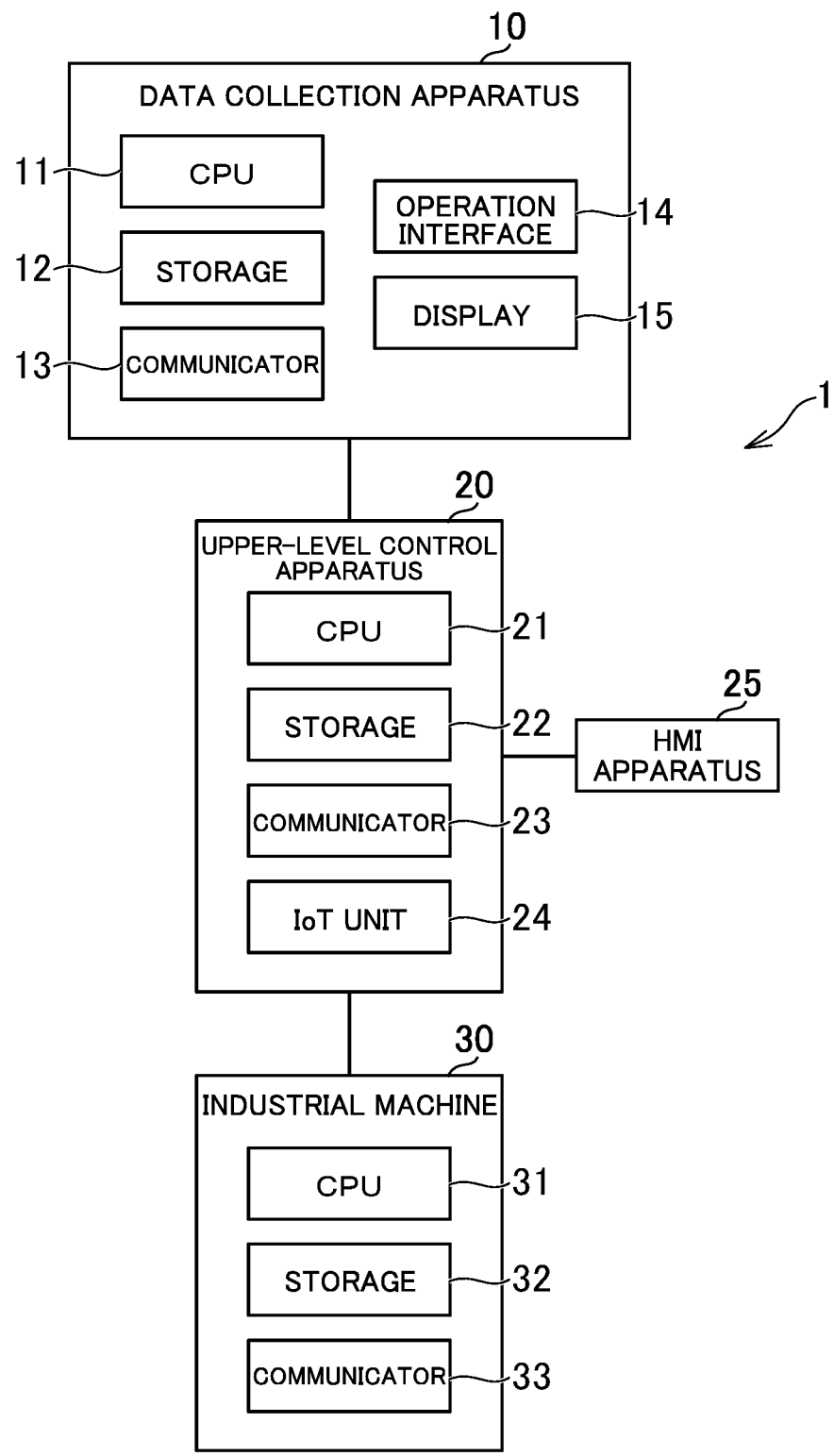
FIG. 1 is a diagram for illustrating an example of an overall configuration of a data collection system.

FIG. 1 is a diagram for illustrating an example of an overall configuration of the data collection system. As illustrated in FIG. 1, the data collection system 1 includes a data collection apparatus 10, an upper-level control apparatus 20, and an industrial machine 30. Each apparatus is connected to one another through any network such as a field network or a general network.

The data collection apparatus 10 is an apparatus capable of collecting various types of data in the data collection system 1. The "collection" in the first embodiment is the same in meaning as "reception" or "acquisition." For example, the data collection apparatus 10 is a personal computer, a server computer, a tablet terminal, or a smartphone. For example, the data collection apparatus 10 includes a CPU 11, a storage 12, a communicator 13, an operation interface 14, and a display 15.

The CPU 11 includes at least one processor. The CPU 11 is a type of a circuitry. The storage 12 includes at least one of a volatile memory or a nonvolatile memory. The communicator 13 includes at least one of a communication interface for wired communication or a communication interface for wireless communication. The operation interface 14 is an input device such as a mouse or a keyboard. The display 15 is a liquid crystal display or an organic EL display.

The upper-level control apparatus 20 is an apparatus for controlling one or more industrial machines 30. Meaning of "control" in the first embodiment not only includes instructing the industrial machine 30 to start a process, but also includes issuing, without instructing the start of the process in principle, only other minimum instructions to the industrial machine 30. It is only required that a configuration in which the industrial machine 30 executes a certain operation based on a certain instruction issued from the upper-level control apparatus 20 correspond to the control.

The upper-level control apparatus 20 can control any number of industrial machines 30. When the entire data collection system 1 is referred to as "cell," the upper-level control apparatus 20 is sometimes referred to as "cell controller." The upper-level control apparatus 20 may be an apparatus having another name, for example, a programmable logic controller (PLC). For example, the upper-level control apparatus 20 includes a CPU 21, a storage 22, a communicator 23, and an IoT unit 24. A human machine interface (HMI) apparatus 25 can be connected to the upper-level control apparatus 20. The physical configuration of each of the CPU 21, the storage 22, and the communicator 23 may be the same as that of the CPU 11, the storage 12, and the communicator 13, respectively.

The IoT unit 24 is hardware for transmitting data to another computer through a network. For example, the IoT unit 24 includes a CPU, a storage, and a communicator. The physical configuration of each of the CPU, the storage, and the communicator included in the IoT unit 24 may be the same as that of the CPU 11, the storage 12, and the communicator 13, respectively. For example, consistency of data may be achieved periodically or non-periodically between the CPU 21 and the IoT unit 24. When the CPU 21 has the function of the data collection, the IoT unit 24 may be omitted.

The HMI apparatus 25 is an apparatus for a user to set the upper-level control apparatus 20. The HMI apparatus 25 may be an apparatus developed specifically for the upper-level control apparatus 20, or may be a personal computer, a tablet terminal, or a smartphone. The HMI apparatus 25 may be capable of setting the industrial machine 30. For example, the user connects the HMI apparatus 25 to the upper-level control apparatus 20 or the industrial machine 30 to execute at least one of creation of a program, setting of parameters, setting of variables, or setting of communication.

The industrial machine 30 is a machine that can be controlled by the upper-level control apparatus 20. The industrial machine 30 is also sometimes be referred to as "equipment" or "apparatus." A group of a plurality of industrial machines 30 is sometimes referred to as "line" or "cell." The industrial machine 30 may be any machine, and is, for example, a PLC, a robot controller, an industrial robot, a motor controller, a servo amplifier, a motion controller, a numerical control apparatus, or a power conversion apparatus. For example, the industrial machine 30 includes a CPU 31, a storage 32, and a communicator 33. The physical configuration of each of the CPU 31, the storage 32, and the communicator 33 may be the same as that of the CPU 11, the storage 12, and the communicator 13, respectively.

The programs and data stored in each of the storages 12, 22, and 32 may be supplied through the network. Moreover, the hardware configuration of each apparatus is not limited to the above-mentioned example, and various types of hardware can be applied. For example, a reader (for example, memory card slot) for reading a computer-readable information storage medium and an input/output device (for example, USB terminal) for connecting to an external device may be included. In this case, programs and data stored in the information storage medium may be supplied through the reader or the input/output device. Moreover, a circuit called "FPGA" or "ASIC" may be included.

[1-2. Overview of Data Collection System]

In the data collection system 1, at least one process is executed in a predetermined order for each of a plurality of objects. The object is an article to be worked on. The object is also referred to as "workpiece." The object may be any one of a product finally produced, an intermediate product, a material, and a raw material. The object may be an object of any type, and is, for example, a semiconductor device, an electrical appliance, a vehicle, food, or a commodity. The process is work performed on the object, and is, for example, machining, assembly, transport, gripping, measurement, or inspection. The process can be considered as operation of the industrial machine 30.

The industrial machine 30 stores a process program in which individual behaviors in a process are defined. The industrial machine 30 determines whether or not an execution condition for the process is satisfied, and executes the process program to start the process when the execution condition is satisfied. The execution condition may be any condition, and may be, for example, a condition that a predetermined instruction is received from the upper-level control apparatus 20, a condition that a variable prepared for each process program reaches a predetermined value, or a condition that a predetermined signal is input from a sensor.

For example, one or more sensors are connected to the industrial machine 30. The sensor may be a sensor of any type, and is, for example, a vision sensor, a torque sensor, a motor encoder, an object detection sensor, a temperature sensor, or a gripping sensor. The industrial machine 30 records information such as an image generated by the vision sensor or a physical quantity detected by the torque sensor in time series based on an instruction from the upper-level control apparatus 20. The data recorded in time series is hereinafter referred to as "collection data."

The collection data is data to be collected in the data collection system 1. The collection data is also sometimes referred to as "trace data" or "logging data." In the first embodiment, the collection data is assumed to include information at each of a plurality of time points, but the collection data may include information (instantaneous value) only at a certain time point. Time information (time stamp) is associated with each piece of the information included in the collection data.

In the first embodiment, description is given of a case in which the time information is synchronized between the upper-level control apparatus 20 and the industrial machine 30, but it is not particularly required that the time information be synchronized. Moreover, in the first embodiment, description is given of a case in which the upper-level control apparatus 20 and the industrial machine 30 are different from each other in control cycle, but the control cycles thereof may be the same. The time information is synchronized, but the control cycles are different from each other (the control cycles are not synchronized), and thus asynchronous data collection is to be executed in the data collection system 1.

The collection data may include any information, and includes, for example, at least one of pieces of information such as a value of the variable stored in the industrial machine 30, the information detected by each of the sensors, a calculation result inside the industrial machine 30, an occurrence state of an alarm, a parameter during the execution of a process, an inspection result of an object obtained by an inspection apparatus, a measurement result of an object obtained by a measurement apparatus, and a process program and firmware which have been used in execution of a process. The collection data may include, for example, a value of a variable stored in the upper-level control apparatus 20.

The collection data is collected for various purposes, and those various purposes include securing traceability of an object, analysis of a cause of an alarm, an increase in quality of an object, and an increase in operation efficiency of a cell. For example, when the collection data is collected for the purpose of securing the traceability of an object, at least one of information that can identify the object itself or information that can identify a process executed on the object may be associated with the collection data. When those pieces of information are associated with the collection data, it is possible to use, after the object is made into a product and is shipped, the collection data associated with the product to analyze a state of manufacturing of the product. For example, even when small-quantity and large-variety production of a variable quantity type is executed, it is possible to secure traceability for each object.

Figure 2:
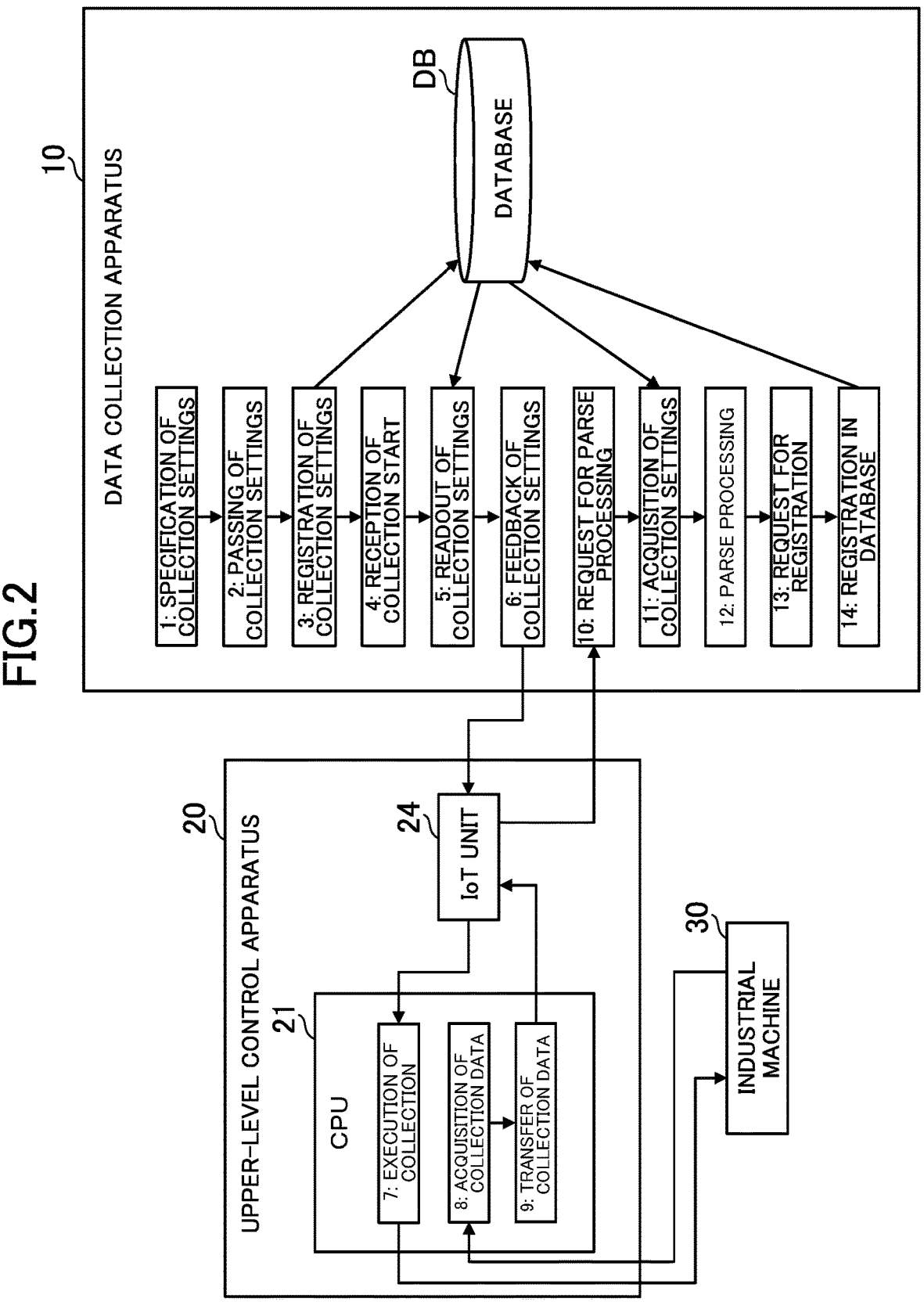
FIG. 2 is a diagram for illustrating an example of a flow of data collection in the data collection system according to a first embodiment of the present disclosure.

FIG. 2 is a diagram for illustrating an example of a flow of the data collection in the data collection system 1 according to the first embodiment. As illustrated in FIG. 2, in the data collection system 1, the collection data is collected by executing roughly-divided Processing 1 to Processing 14. Processing 1 to Processing 14 of FIG. 2 are roughly divided pieces of processing, and a detailed description of each of the pieces of processing is given at a corresponding portion of a functional block of FIG. 4 and corresponding portions of flowcharts of FIG. 8 and FIG. 9.

First, the user starts a setting tool stored in the storage 12 of the data collection apparatus 10 to display a setting screen for specifying collection settings on the display 15 (Processing 1). The setting tool is an application for performing the collection settings. The setting tool may be a tool for setting at least one of the upper-level control apparatus 20 or the industrial machine 30. For example, it may be possible for the user to use the setting tool to set the industrial machine 30 to be controlled by the upper-level control apparatus 20, to set each process executed by the industrial machine 30, to create a control program, and to create a process program.

Figure 3:
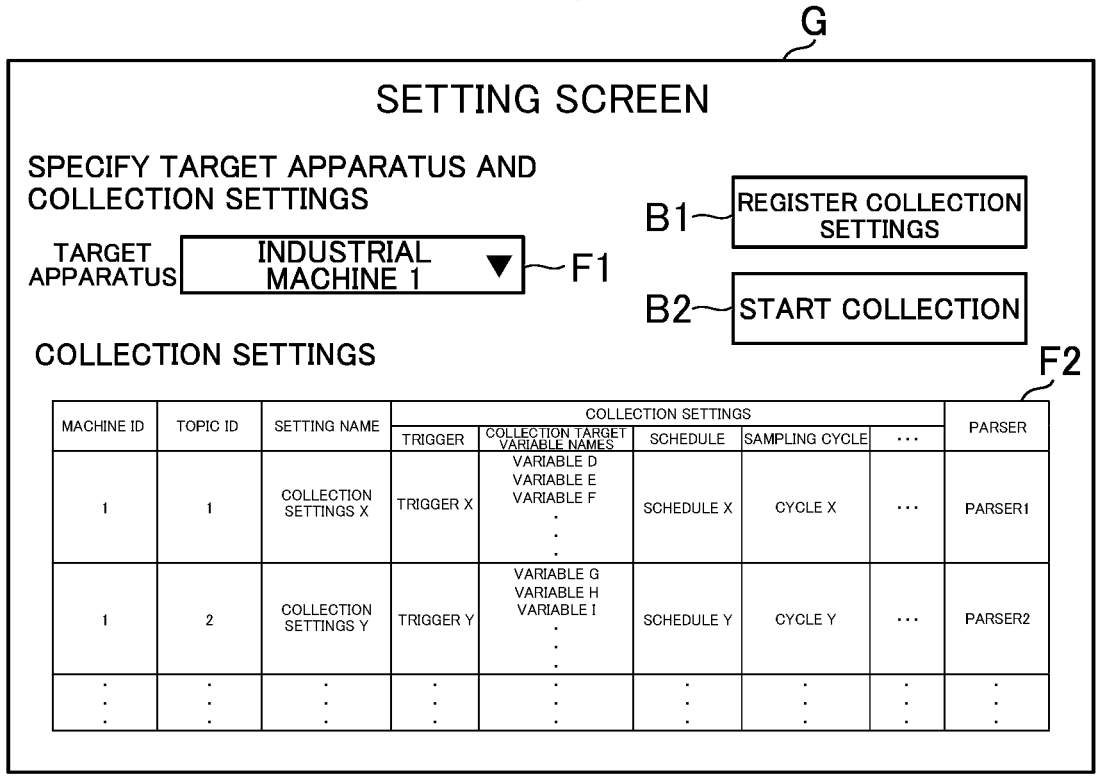
FIG. 3 is a view for illustrating an example of a setting screen.

FIG. 3 is a view for illustrating an example of the setting screen. As illustrated in FIG. 3, on a setting screen G, an input form F1, an input form F2, a button B1, and a button B2 are displayed. The input form F1 is used to specify an industrial machine 30 being a target of the data collection. The input form F2 is used to specify specific contents of the collection settings. The button B1 is used to register the collection settings. The button B2 is used to start the data collection. In the first embodiment, description is given of the case in which the specification of the collection settings and the start of the data collection are executed on the same setting screen G, but the specification and the start may be executed on different screens.

In the input form F1, the industrial machines 30 to be controlled by the upper-level control apparatus 20 are displayed so that the industrial machines 30 can be selected. For example, the data collection apparatus 10 or the upper-level control apparatus 20 stores definition information in which the industrial machines 30 to be controlled are defined. This definition information includes information that can identify the industrial machine 30 to be controlled, and includes, for example, at least one of a machine ID, a machine name, a communication method, or an IP address. The definition information may include definition of a variable used in the control of the industrial machine 30, and may include, for example, at least one of a variable name, an address of a register, a data type, or a data size (number of bytes). For example, in the input form F1, a list of the industrial machines 30 indicated by the definition information is displayed. The user selects, from the list, an industrial machine 30 for which the collection settings are to be specified.

In the input form F2, a value of each item included in the collection settings is displayed. In the example of FIG. 3, the input form F2 has a tabular form, and a value can be input to each cell of the table. The collection settings may include any item, and include, for example, a machine ID, a topic ID, a setting name, a trigger, variable names of variables to be collected, a schedule, and a sampling cycle. The collection settings are not limited to the example in the first embodiment, and may include specification of other information, for example, an axis of a motor being a target of the collection. In the first embodiment, parse processing corresponding to the collection settings is executed, and thus parsers are also specified on the setting screen G. A detailed description is later given of the parsers and the parse processing.

The machine ID is information that can identify an industrial machine 30 being a target of the data collection based on the collection settings. The topic ID is information that can identify the collection settings. In the first embodiment, a plurality of collection settings can be registered for one industrial machine 30. Each collection setting is identified based on a set of the machine ID and the topic ID. The setting name is a name of a collection setting. The trigger is a start condition for the data collection. The variable name is a name of the variable being a target of the collection. The schedule is a time at which the data collection is to be executed. The sampling cycle is a time interval of the data collection.

The user specifies the industrial machine 30 from the input form F1, and specifies the contents of the collection settings in the input form F2. To the machine ID of the input form F2, the machine ID of the industrial machine 30 specified in the input form F1 may be automatically input. When the user selects the button B1, the contents of the collection settings specified on the setting screen G are passed to an IoT module of the data collection apparatus 10 (Processing 2). The IoT module is one of programs executed by the data collection apparatus 10, and is responsible for transmission and reception of data to and from the IoT unit 24 of the upper-level control apparatus 20.

The IoT module registers the collection settings passed from the setting tool in a database DB stored in the storage 12 of the data collection apparatus 10 (Processing 3). After that, when a timing at which the user wants to start the data collection arrives, the user selects the button B2 after specifying the collection settings for the data collection to be started. In the first embodiment, description is given of a case in which the collection settings for the data collection to be started are specified by selecting a row of the input form F2, but this collection setting can be specified by any method, and may be specified on another screen. For example, a list of the collection settings registered in the database DB may be displayed on another screen, and the collection settings may be specified from the list.

When the instruction to start the data collection is received through the button B2 (Processing 4), the IoT module reads out the collection settings registered in the database DB (Processing 5). As described above, in the first embodiment, the collection settings are identified based on the set of the machine ID and the topic ID, and the IoT module thus reads out, from the database DB, the collection settings associated with the set of the machine ID and the topic ID specified from the input form F2 by the user.

The IoT module feeds back the collection settings read out from the database DB to the upper-level control apparatus 20 (Processing 6). The feedback is transmission of certain data from the data collection apparatus 10 to the upper-level control apparatus 20. As illustrated in FIG. 2, when the IoT unit 24 of the upper-level control apparatus 20 receives, from the data collection apparatus 10, the collection settings to be fed back, the IoT unit 24 transfers the collection settings to the CPU 21. The set of the machine ID and the topic ID corresponding to the collection settings is also fed back.

It is assumed in the first embodiment that consistency of variables is achieved periodically or non-periodically between the CPU 21 and the IoT unit 24. It is assumed that whether a variable of the IoT unit 24 is transferred (copied) to the CPU 21 or the variable of the CPU 21 is transferred (copied) to the IoT unit 24 is determined based on an attribute of the variable. Variables corresponding to the collection settings to be fed back are required to be transferred from the IoT unit 24 to the CPU 21, and a corresponding attribute is thus accordingly defined. Meanwhile, variables corresponding to the collection data are required to be transferred from the CPU 21 to the IoT unit 24, and a corresponding attribute is thus accordingly defined. Those attributes of the variables may be specified by the user from the setting tool, or may be defined as default attributes.

The CPU 21 of the upper-level control apparatus 20 uses an application (hereinafter referred to as "collection application") for the data collection to acquire the collection settings fed back through the IoT unit 24, and executes the collection of the collection data (Processing 7). The collection application is created by the user, and is stored in advance in the storage 22 of the upper-level control apparatus 20. The collection application can execute various types of processing for the data collection, and executes, for example, each of acquisition of the fed-back collection settings, setting of the collection settings to the industrial machine 30, instruction of the collection start to the industrial machine 30, setting of the trigger to the industrial machine 30, and readout of the collection data from the industrial machine 30.

When the CPU 21 of the upper-level control apparatus 20 acquires the collection data from the industrial machine 30 (Processing 8), the CPU 21 transfers the collection data acquired from the industrial machine 30 to the IoT unit 24 (Processing 9). The CPU 21 stores the set of the machine ID and the topic ID corresponding to the collection settings in a header of a packet when the CPU 21 transfers the collection data. As a result, the data collection apparatus 10 can identify the collection settings to which the collection data corresponds. The IoT unit 24 of the upper-level control apparatus 20 transfers the collection data to the data collection apparatus 10. The IoT module of the data collection apparatus 10 requests the parser for the parse processing for the transferred collection data (Processing 10).

The parser is a program for analyzing the collection data to convert data structure. The parser is stored in advance in the storage 12 of the data collection apparatus 10. At least one parser is stored in the data collection apparatus 10. When common rules for the data structure can be adopted among a plurality of collection settings, a general-purpose parser common to the plurality of collection settings may be prepared. When it is required to prepare a parser specialized for the data structure of each collection setting, a parser may be prepared for each collection setting. Similarly, a general-purpose parser common to a plurality of industrial machines 30 may be prepared, or a parser may be prepared for each industrial machine 30.

The parser of the data collection apparatus 10 refers to the database DB, and acquires the collection settings associated with the set of the machine ID and the topic ID included in the header of the collection data (Processing 11). The parser of the data collection apparatus 10 executes the parse processing for the collection data based on the acquired collection settings (Processing 12). The parser of the data collection apparatus 10 requests the IoT module to register the collection data after the parse processing in the database DB (Processing 13). The IoT module of the data collection apparatus 10 registers the collection data after the parse processing in the database DB (Processing 14), and the registration of the collection data is completed.

As described above, in the data collection system 1 according to the first embodiment, the collection settings stored in the database DB is identified based on the set of the machine ID and the topic ID. The parse processing is executed, based on this identified collection settings, for the collection data collected from the industrial machine 30. As a result, the parse processing corresponding to the collection settings for the collection data is achieved. A detailed description is now given of this configuration.

[1-3. Functions Implemented in Data Collection System]

Figure 4:
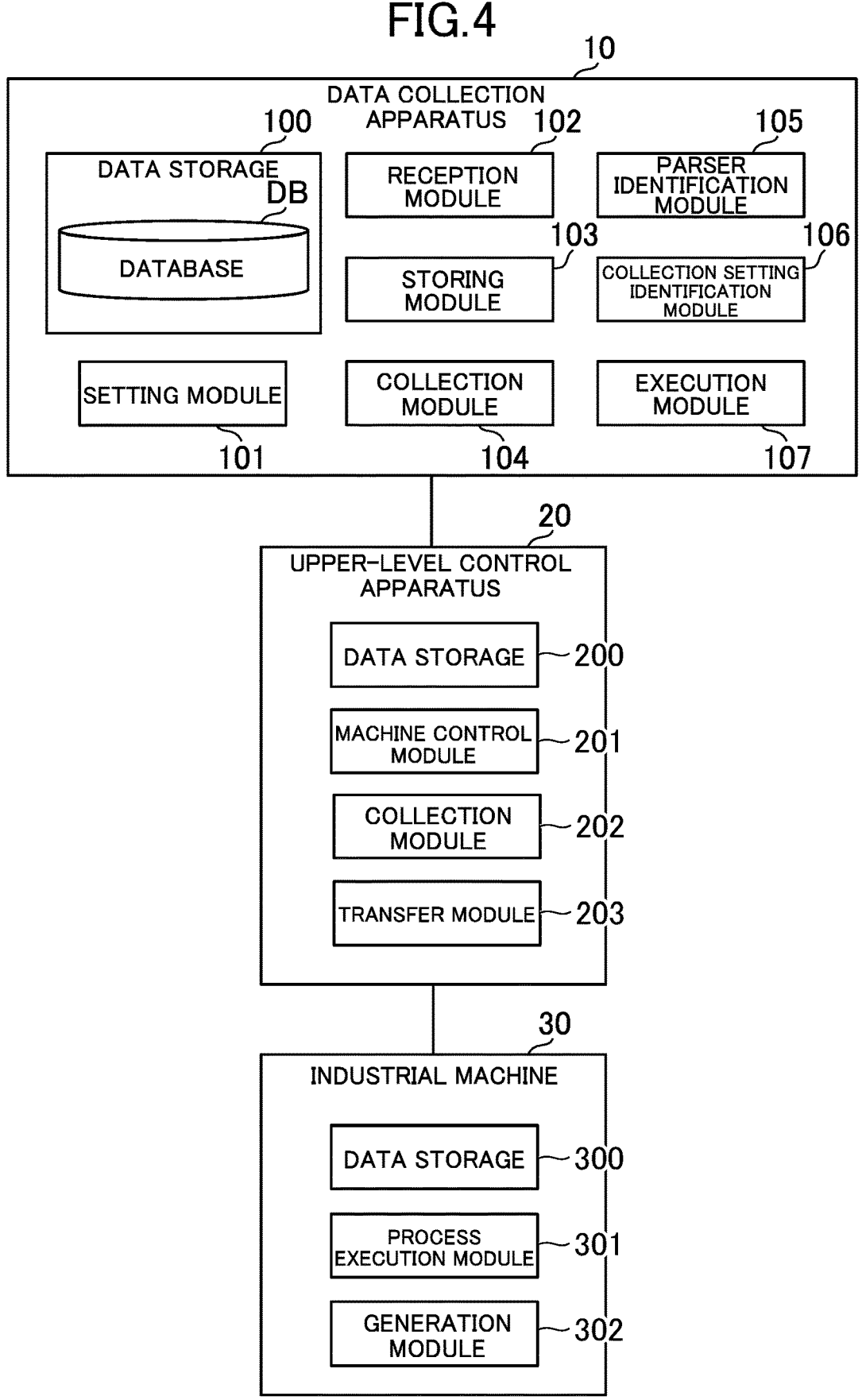
FIG. 4 is a functional block diagram for illustrating an example of functions implemented in the data collection system according to the first embodiment.

FIG. 4 is a functional block diagram for illustrating an example of functions implemented in the data collection system 1 according to the first embodiment. In the first embodiment, description is given of functions implemented in each of the data collection apparatus 10, the upper-level control apparatus 20, and the industrial machine 30.

[1-3-1. Functions Implemented in Data Collection Apparatus]

As illustrated in FIG. 4, the data collection apparatus includes a data storage 100, a setting module 101, a reception module 102, a storing module 103, a collection module 104, a parser identification module 105, a collection setting identification module 106, and an execution module 107. The data storage 100 is implemented mainly by the storage 12. Each of the other functions is implemented mainly by the CPU 11.

[Data Storage]

The data storage 100 stores data required to collect the collection data. For example, the data storage 100 stores the database DB. The data stored in the data storage 100 is not limited to the database DB, and the data storage 100 may also store, for example, each of at least one parser, the IoT module, the setting tool, the control programs created by the user, the process programs created by the user, the definition information on the industrial machines 30 to be controlled by the upper-level control apparatus 20, and the definition information on the processes executed by the industrial machines 30.

FIG. 5 is a table for showing a data storage example of the database DB. As shown in FIG. 5, the database DB is a database storing each of the individual collection settings specified by the user and the collection data collected based on those collection settings. For example, the database DB stores the machine IDs, the topic IDs, the setting names, the feedback variable names, the collection settings, the collection data before the parse processing, and the collection data after the parse processing. The database DB stores, for each set of the machine ID and the topic ID, the setting name, the feedback variable names, the collection settings, the collection data before the parse processing, and the collection data after the parse processing.

The feedback variable name is a name of a variable to be used for the feedback of the collection settings. The collection data before the parse processing is data for which the parse processing has not been executed. The collection data received from the upper-level control apparatus 20 is directly stored as the collection data before the parse processing. The collection data before the parse processing is sometimes referred to as "raw data." The collection data after the parse processing is the data converted by the parse processing. After the collection data after the parse processing is stored, the collection data before the parse processing may be deleted.

For example, when collection data on each of a plurality of objects is collected based on a certain collection setting, the collection data is stored for each object in the database DB. Through the storage of the collection data for each object, the traceability of the object is secured. The data stored in the database DB is not limited to the example of FIG. 5, and any data relating to the data collection can be stored therein. For example, a date and time of the collection of the collection data may be stored, and information that can identify a cell to which the industrial machine 30 belongs may be stored.

In the first embodiment, description is given of a case in which the data is collectively managed in the one database DB, but the data may be distributed to a plurality of databases and may be managed in a distributed manner. For example, a database for storing the collection settings and a database for storing the collection data may exist independently of each other. Moreover, for example, an independent database may exist for each industrial machine 30, or an independent database may exist for each collection setting.

[Setting Module]

The setting module 101 sets the machine ID based on the definition information relating to the control targets of the upper-level control apparatus 20. The definition information is information relating to the industrial machines 30 that can be controlled by the upper-level control apparatus 20. For example, the user uses the setting tool to create the definition information. The definition information includes machine IDs of the industrial machines 30 that can be controlled by the upper-level control apparatus 20. The machine ID may not be included in the definition information, but may be generated from information included in the definition information, or may be specified by the user.

The machine ID is an example of first identification information. Accordingly, a portion described as "machine ID" can be replaced by "first identification information" in the first embodiment. The first identification information is only required to be information that can identify the industrial machine 30, and may be other information such as an ID other than the machine ID, the machine name of the industrial machine 30, or the IP address of the industrial machine 30.

In the first embodiment, the setting module 101 acquires the machine ID included in the definition information stored in the data storage 100 of the data collection apparatus 10 or a data storage 200 of the upper-level control apparatus 20, and sets the acquired machine ID as the machine ID to be associated with the setting information. The setting of the machine ID is identifying or determining the machine ID to be associated with the collection settings. The machine ID may not be set from the definition information, but may be manually input by the user or may be automatically set based on a predetermined ID issuance rule.

For example, the setting module 101 sets the machine ID of the industrial machine 30 specified by the user to each of the input form F1 and the input form F2 of the setting screen G. The setting module 101 displays the industrial machines 30 indicated by the machine IDs included in the definition information on the input form F1 so that the industrial machines 30 can be selected. When the user selects the button B1 to instruct the registration of the collection settings, the setting module 101 sets the machine ID specified in each of the input form F1 and the input form F2 as the machine ID to be associated with the collection settings to be registered.

[Reception Module]

The reception module 102 receives the specification of the identification information and the collection settings by the user. The identification information is information that can identify the collection settings. In the first embodiment, the set of the machine ID and the topic ID corresponds to the identification information. Accordingly, a portion describing the set of the machine ID and the topic ID in the first embodiment can be replaced by "identification information". The identification information is not limited to the set of the machine ID and the topic ID, and is only required to be information that can identify the collection setting. For example, only one of the machine ID and the topic ID may correspond to the identification information. Moreover, for example, the identification information may be another ID, or may be information other than an ID, for example, the setting name.

In the first embodiment, the user specifies the various settings relating to the data collection on the setting screen G, and thus the reception module 102 receives an operation on the setting screen G, to thereby receive the specification of the machine ID, the topic ID, and the collection settings. For example, the reception module 102 receives the selection of the industrial machine 30 in the input form F1, to thereby receive the specification of the machine ID. Moreover, for example, the reception module 102 receives the specification of the sets of the machine ID and the topic ID in the input form F2.

Moreover, for example, the reception module 102 receives the specification of the collection settings in the input form F2. In the example of FIG. 3, the reception module 102 receives, as the collection settings, the specification of the trigger, the variable names of the variables being a target of the collection, the schedule, and the sampling cycle. The trigger may be any condition, and may be, for example, at least one of the value of the variable of the industrial machine 30, a value calculated from the variable, the time information managed by the industrial machine 30, an input signal to the industrial machine 30, or a detection result obtained by the sensor connected to the industrial machine 30. The reception module 102 receives the specification of those conditions.

The variable names included in the collection settings are the names of the variables that are to be collected among the variables stored in the industrial machine 30. The variable names may be directly input by the user, or may be acquired from variable definition stored in the data storage 100. The reception module 102 receives the specification of the variable name by the user. The schedule is only required to be information that can identify a timing at which the data collection is executed, and is, for example, a day of week, a date, or a time period of the execution of the data collection. The reception module 102 receives the specification of the day of week and the like. The sampling cycle is only required to be a numerical value that can identify time intervals of the data collection. The reception module 102 receives the specification of the numerical value indicating the sampling cycle.

[Storing Module]

The storing module 103 stores the set of the machine ID and the topic ID and the collection settings in the database DB in association with each other. In the first embodiment, description is given of the case in which the storing module 103 stores the set of the machine ID and the topic ID specified by the user and the collection settings specified by the user in the database DB in association with each other, but at least one of the set or the collection settings may automatically be generated by a computer, for example, the data collection apparatus 10. The storing module 103 may store the set of the machine ID and the topic ID automatically generated and the collection settings automatically generated in the database DB in association with each other. The storing module 103 stores the set of the machine ID and the topic ID and the collection settings in the database DB so that the collection settings can be searched for through use of the set of the machine ID and the topic ID as a query. The collection settings correspond to an index for the search. The storing module 103 stores the set of the machine ID and the topic ID and the collection settings in the same record of the database DB.

[Collection Module]

The collection module 104 collects the collection data relating to the industrial machine 30 based on the predetermined collection settings. The collection module 104 collects the collection data generated by the industrial machine 30 based on the collection settings or collection data after processing that is obtained by performing certain processing on the collection data generated by the industrial machine 30 based on the collection settings. It is assumed that this processing is performed by the upper-level control apparatus 20 or the industrial machine 30. In the first embodiment, the set of the machine ID and the topic ID is associated with the collection data, and the collection module 104 thus collects the collection data with which this set is associated.

As described above, the identification information in the first embodiment includes the machine ID that can identify the industrial machine 30 and the topic ID different from the machine ID, and the collection module 104 thus acquires the collection data with which the machine ID and the topic ID are associated. The topic ID is an example of second identification information. Thus, a portion described as "topic ID" in the first embodiment can be replaced by "second identification information". The second identification information is information that can identify the collection settings, and is not limited to the topic ID. For example, the second identification information may be other information such as an ID other than the topic ID or the setting name of the collection settings.

The topic ID in the first embodiment is used not only to identify the collection setting, but is used as a part of each of the variable names of the variables for feeding back the collection setting. For example, the topic ID is the whole of or a part of a variable name that can identify the variable used by the collection application relating to the collection data. This variable is not limited to the variable for the feedback, but may be a variable used for another purpose of the data collection. The variable name is an example of variable identification information. Thus, a portion described as "variable name" in the first embodiment can be replaced by "variable identification information". The variable identification information is not limited to the variable name, and may be other information, for example, an ID.

Figure 6:
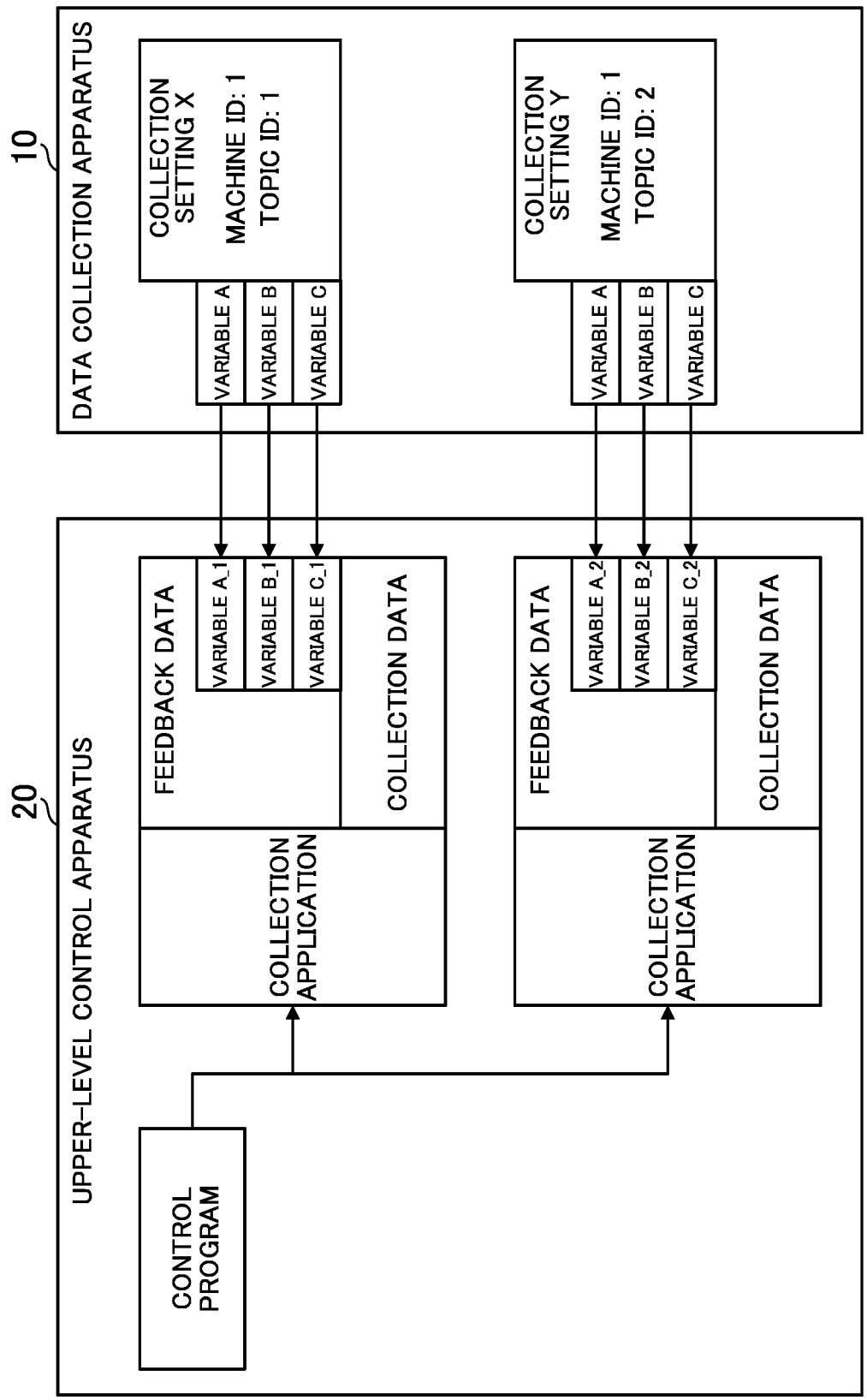
FIG. 6 is a diagram for illustrating an example in which variable names for feedback are distinguished from one another based on topic IDs.

FIG. 6 is a diagram for illustrating an example in which the variable names for the feedback are distinguished from one another based on the topic IDs. In the example of FIG. 6, a case in which two collection settings are specified is illustrated. The two collection settings are "collection setting X" in which the machine ID is "1" and the topic ID is "1," and "collection setting Y" in which the machine ID is "1" and the topic ID is "2." It is assumed that three variables "variable A," "variable B," and "variable C" are prepared as variables for feeding back those two collection settings to the upper-level control apparatus 20. For example, "variable A" corresponds to the machine ID, "variable B" corresponds to the topic ID, and "variable C" corresponds to the collection settings. Those variable names are default, and are the same. As a result, the upper-level control apparatus 20 cannot identify which of the two collection settings is to be fed back.

Thus, in the first embodiment, the variable names for the feedback can be distinguished by adding the topic ID to the end of the variable names. Those variable names are "feedback variable names" stored in the database DB of FIG. 5. As illustrated in FIG. 6, for example, the collection module 104 sets variable names "variable A_1," "variable B_1," and "variable C_1" obtained by adding "1" being the topic ID to the ends as the variables for the feedback of "collection setting X." Moreover, for example, the collection module 104 sets variable names "variable A_2," "variable B_2," and "variable C_2" obtained by adding "2" being the topic ID to the end as the variables for the feedback of "collection setting Y."

The collection module 104 executes the feedback to the upper-level control apparatus 20 so that the variables having the variable names set as described above indicate the values of the individual items of the collection settings. The collection application of the upper-level control apparatus 20 monitors the variables having those variable names, and detects the execution of the feedback of the collection settings when the feedback by the collection module 104 is executed (when the values of the variables are changed), and acquires the collection settings. The control program of the upper-level control apparatus 20 determines whether or not the feedback is detected by the collection application while controlling the industrial machine 30. When the collection application detects the feedback, the control program adjusts a task so that collection data can be collected by the collection application in the series of a flow of controlling the industrial machine 30.

As described above, the collection application acquires the collection setting fed back from the data collection apparatus 10 based on the variables having the variable names including the topic ID as a part. The topic ID may be included in any position of the variables for the feedback, and the position is not limited to the end as illustrated in FIG. 6. For example, the topic ID may be included in the beginning or the middle of the variable name. Moreover, for example, the topic ID may not be included in the variable names of the variables for the feedback, but may be included in variable names of the variables corresponding to the collection data. In the first embodiment, the collection application executes processing relating to the collection of the collection data corresponding to the collection setting based on the variables for the feedback. The collection module 104 collects the collection data based on the processing executed by the collection application. The collection module 104 collects the collection data transferred by the collection application. When a plurality of industrial machines 30 exist, the collection data collected from the industrial machines 30 may be stored in databases DB each prepared for each industrial machine 30. In this case, which industrial machine 30 the collection data was collected from can be identified based on the machine ID associated with the collection data, and the collection module 104 is thus only required to identify, based on this machine ID, which database DB the collection data is to be stored in.

Figure 7:
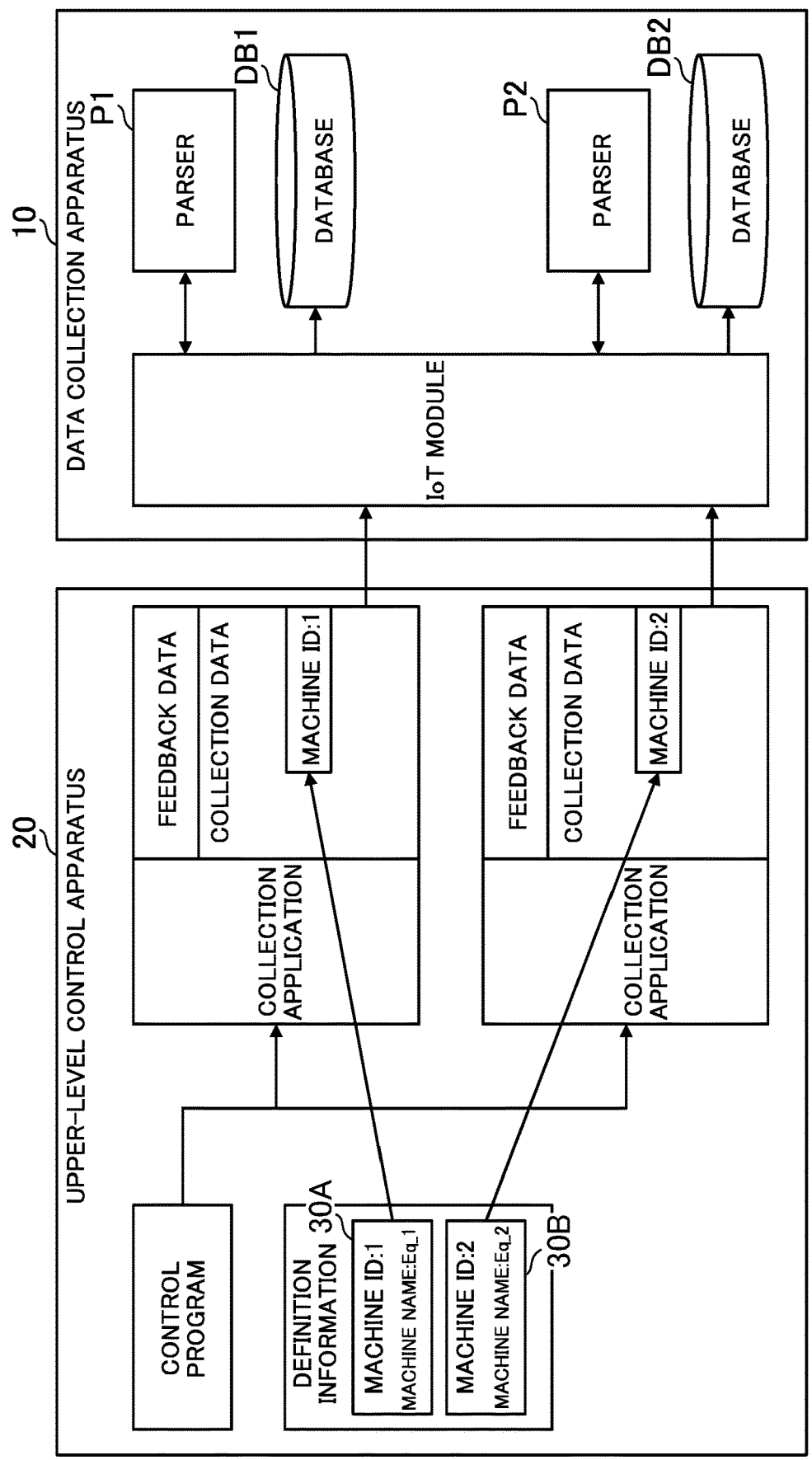
FIG. 7 is a diagram for illustrating an example of a case in which the database is prepared for each industrial machine.

FIG. 7 is a diagram for illustrating an example of the case in which a database DB is prepared for each industrial machine 30. In the example of FIG. 7, there is illustrated a case in which two industrial machines 30 being an industrial machine 30A and an industrial machine 30B exist. The industrial machine 30A has a machine ID of "1" and a machine name of "Eq_1." The industrial machine 30B has a machine ID of "2" and a machine name of "Eq_2." In FIG. 7, reference symbols of "30A" and "30B" are illustrated in the definition information, but the physical industrial machines 30 do not exist in the upper-level control apparatus 20.

In the first embodiment, the machine ID is associated with the collection data, and the collection module 104 thus identifies, based on the machine ID associated with the collection data, the industrial machine 30 by which the collection data was generated. For example, the collection application of the upper-level control apparatus 20 associates the collection data collected from the industrial machine 30A with the machine ID "1" indicating this industrial machine 30A. The topic ID is also associated with the collection data, but is omitted in FIG. 7. The collection application of the upper-level control apparatus 20 associates the collection data collected from the industrial machine 30B with the machine ID "2" indicating this industrial machine 30B.

The collection module 104 refers to the machine ID associated with the collection data collected from the upper-level control apparatus 20, to thereby identify the database DB storing this collection data. For example, when the machine ID associated with the collection data collected from the upper-level control apparatus 20 is "1," the collection module 104 stores the collection data before the parse processing in a database DB1 for the industrial machine 30A. Moreover, for example, when the machine ID associated with the collection data collected from the upper-level control apparatus 20 is "2," the collection module 104 stores the collection data before the parse processing in a database DB2 for the industrial machine 30B.

In FIG. 7, the pieces of processing by the collection module 104, the parser identification module 105, and the collection setting identification module 106 are illustrated as the processing executed by the IoT module. Those pieces of processing may not be executed by one module, for example, the IoT module, but may be distributed to modules based on individual functions of the modules. As illustrated in FIG. 7, in the parser identification module 105 described below, when the machine ID associated with the collection data collected from the upper-level control apparatus 20 is "1," the collection module 104 identifies a parser P1 for the industrial machine 30A. Moreover, for example, when the machine ID associated with the collection data collected from the upper-level control apparatus 20 is "2," the collection module 104 identifies a parser P2 for the industrial machine 30B. Each of those pieces of collection data after the parse processing is stored in the database DB1 or the database DB2 by the collection module 104.

Moreover, as described above, in the first embodiment, the control cycle of the upper-level control apparatus 20 and the control cycle of the industrial machines 30 are different from each other. Moreover, in the first embodiment, description is given of a case in which the control cycle of the upper-level control apparatus 20 is longer than the control cycle of the industrial machines 30, but the control cycle of the upper-level control apparatus 20 may be shorter than the control cycle of the industrial machines 30. Further, for example, it is not particularly required to execute the cyclic control in each of the upper-level control apparatus 20 and the industrial machines 30. The collection module 104 collects the generated collection data based on the control cycle of the industrial machine 30 different from the control cycle of the upper-level control apparatus 20 through the upper-level control apparatus 20.

When the control cycles are different from each other, it is considered that the time point of the collection of the collection data cannot be identified, but it is assumed that the upper-level control apparatus 20 and the industrial machines 30 are temporally in synchronized with each other. For example, each of the upper-level control apparatus 20 and the industrial machines 30 manages own time information (for example, a timer). The upper-level control apparatus 20 transmits, to the industrial machines 30, a synchronization instruction including the time information of the upper-level control apparatus 20. When the industrial machine 30 receives the synchronization instruction, the industrial machine 30 sets the time information of the industrial machine 30 to the value included in the synchronization instruction. As a result, the temporal synchronization is achieved.

For example, the collection module 104 collects collection data including the time information of each industrial machine 30. When a plurality of industrial machines 30 are connected under the upper-level control apparatus 20, each of the industrial machine 30 manages unique time information. The collection data generated by a certain industrial machine 30 includes the time information managed by this industrial machine 30. For example, when the collection data includes a time-series change in a certain physical quantity in a certain industrial machine 30, the collection module 104 collects the collection data in which the physical quantity detected at each time point of a plurality of time points indicated by time information managed by this industrial machine 30 is associated with this time information.

In the first embodiment, the industrial machine 30 collects the collection data based on a predetermined trigger. The collection module 104 collects the collection data including time information corresponding to the trigger. The trigger is a condition for starting the collection of the collection data. Any trigger can be set to the industrial machine 30, and the trigger is, for example, a condition relating to the physical quantity detected by the sensor connected to the industrial machine 30, a condition relating to the input signal to the industrial machine 30, a condition relating to a state of an object detected through use of the vision sensor, or a condition relating to the variable stored in the industrial machine 30.

The time information corresponding to the trigger is time information at the time when the trigger is satisfied. This time information may be time information managed by the industrial machine 30 or other time information after the time information managed by the industrial machine 30 is converted to the other time information. This time information may be time information at a time point at which the trigger is determined to be satisfied or time information at a later time point. The later time point is in a range of from the time point at which the trigger is determined to be satisfied to a time point at which the generation of the collection data is completed. Moreover, for example, the time information may be time information at a time point at which the upper-level control apparatus 20 transmits the trigger to the industrial machine 30.

In the first embodiment, the collection module 104 collects the collection data, and stores the collected collection data in the database DB. The collection module 104 may store the collection data in a database other than the database DB storing the collection settings, or may store the collection data in a database of a computer other than the data collection apparatus 10 or an external information storage medium.

[Parser Identification Module]

The parser identification module 105 identifies at least one parser from among a plurality of parsers based on the set of the machine ID and the topic ID associated with the collection data. It is assumed that correspondence between the set of the machine ID and the topic ID and the parser is stored in advance in the data storage 100. In the first embodiment, description is given of a case in which the correspondence is stored in the database DB, but this correspondence may be defined as data other than the database DB.

The set of the machine ID and the topic ID and the parser may be associated with each other on a one-to-one basis, a one-to-many basis, or a many-to-one basis. When a data conversion rule is common to a plurality of collection settings, a common parser may be used for the plurality of collection settings. The parser identification module 105 identifies at least one parser corresponding to the set of the machine ID and the topic ID. In the first embodiment, the parser identification module 105 refers to the set of the machine ID and the topic ID associated with the collection data, to thereby identify a parser associated with this set in the database DB.

[Collection Setting Identification Module]

The collection setting identification module 106 identifies the collection settings based on the set of the machine ID and the topic ID (identification information, that is, the first identification information and the second identification information) associated with the collection data. In the first embodiment, the set of the machine ID and the topic ID is specified by the user, and thus the collection setting identification module 106 identifies the collection settings specified by the user based on the set of the machine ID and the topic ID which is associated with the collection data, and is specified by the user. For example, the collection setting identification module 106 identifies the collection settings based on the database DB and the set of the machine ID and the topic ID associated with the collection data. The collection setting identification module 106 refers to the database DB, to thereby identify the collection settings associated with the set of the machine ID and the topic ID.

[Execution Module]

The execution module 107 executes the parse processing relating to the collection data based on the collection settings identified by the collection setting identification module 106. The execution module 107 inputs the collection settings and the collection data to the parser, and acquires the collection data after the parse processing output from the parser. The parser identifies the data structure of the collection data based on the input collection settings, and executes the parse processing for the collection data based on the identified data structure.

For example, the parser identifies at least one of a data type or a data size of the variable based on the variable name being a target of the collection included in the collection settings. It is assumed that the data type and the data size of the variable are included in the definition information on the variable. The parser executes the parse processing for the collection data based on at least one of the identified data type or data size. In the first embodiment, the collection data is collected in order to secure the traceability of the object, and the collection data is thus converted to data structure that can be handled by a program for tracing the object.

For example, when information having a "String" type is included in the collection data collected based on certain collection settings, and information to be input to the program for tracing an object is information having a "char" type, the parser corresponding to this collection settings converts the information having the "String" type to information having the "char" type. Moreover, for example, when Unicode characters are included in the collection data collected based on certain collection settings, and information to be input to the program for tracing an object is represented by characters in another code, the parser corresponding to this collection settings converts the Unicode characters to information represented by characters having the another code. The parser can execute other various types of conversion, and the conversions themselves executed by the parser may be publicly-known various conversions.

The parse processing can be executed for various purposes. For example, compression of a data size, syntactic analysis of data, thinning of data, or a change of an extension may be executed by the parse processing. The collection data is often input to a program for executing certain analysis, and thus the parser is only required to convert the collection data to a format that can be handled by this program. When the collection data is analyzed by the user, the parser is only required to convert the collection data to a format suitable for display.

For example, the execution module 107 executes the parse processing based on the collection settings identified by the collection setting identification module 106 and the at least one parser identified by the parser identification module. The execution module 107 inputs the collection settings and the collection data to the at least one parser identified by the parser identification module, and acquires the collection data after the parse processing output from the at least one parser.

In the first embodiment, the collection data before the parse processing is temporarily stored in the database DB, and thus the execution module 107 executes the parse processing for the collection data stored in the database DB, and stores the collection data for which the parse processing has been executed in the database DB. The execution module 107 may store the collection data for which the parse processing has been executed in another database. The collection data before the parse processing may not be stored in the database DB, and the execution module 107 may execute the parse processing for the collection data that has not been stored in the database DB.

[1-3-2. Functions Implemented in Upper-Level Control Apparatus]

As illustrated in FIG. 4, in the upper-level control apparatus 20, the data storage 200, a machine control module 201, a collection module 202, and a transfer module 203 are implemented. Each function is implemented mainly by at least one of the CPU 21 or the IoT unit 24.

[Data Storage]

The data storage 200 stores data required to collect the collection data. For example, the data storage 200 stores the collection application, the machine IDs, the topic IDs, the collection settings, the control programs, the definition information on the industrial machines 30, and the definition information on the variables. The data storage 200 may store a plurality of collection applications. In this case, the collection application may be prepared for each collection setting. It is assumed that, in the control program, execution conditions for each process and instruction contents directed to the industrial machine 30 are defined. The control program can be created in any language such as a ladder language or a robot language.

[Machine Control Module]

The machine control module 201 controls the industrial machines 30 based on the control program. For example, the machine control module 201 determines whether or not the execution condition for each process is satisfied based on the control program. When the execution condition for a certain process is satisfied, the machine control module 201 instructs the industrial machine 30 that is to execute the process to start the execution of the process. When the machine control module 201 receives a response indicating finish of the execution of the process from this industrial machine 30, the machine control module 201 determines that the execution condition for a next process is satisfied, and instructs an industrial machine 30 that is to execute the next process to start the execution of the next process. After that, execution of each process is similarly instructed.

[Collection Module]

The collection module 202 collects the collection data based on predetermined collection settings. For example, the collection module 202 acquires collection settings fed back from the data collection apparatus 10 based on the collection application, and records the acquired collection settings in the data storage 200. The collection module 202 identifies, based on the machine ID, an industrial machine 30 to which the collection settings are to be set, and transmits the collection settings to this industrial machine 30. The collection module 202 sets the trigger to this industrial machine 30. The trigger may be set when the collection settings are transmitted. The collection module 202 may transmit to the collection application time information at the time at which the trigger is set. In this case, this time information may be associated with the collection data. When the collection module 202 receives, from the industrial machine 30, a notification that the collection of the collection data is completed, the collection module 202 requests the collection data, to thereby collect the collection data.

[Transfer Module]

The transfer module 203 transfers the collection data collected by the collection module 202 to the data collection apparatus 10. The transfer module 203 associates the collection data generated based on certain collection settings with the set of the machine ID and the topic ID that can identify the collection settings, and transfers the collection data after the association to the data collection apparatus 10. In the first embodiment, description is given of the case in which this set is stored in the header of the packet, but this set may be stored in a body portion of the packet. The collection data may be transmitted as a packet of asynchronous communication.

[1-3-3. Functions Implemented in Industrial Machine]

As illustrated in FIG. 4, in the industrial machine 30, a data storage 300, a process execution module 301, and a generation module 302 are implemented. The data storage 300 is implemented mainly by the storage 32. The process execution module 301 is implemented mainly by the CPU 31.

[Data Storage]

The data storage 300 stores data required to collect the collection data. For example, the data storage 300 stores process programs in each of which an operation of each process is defined, and variables to which at least one of reference or change is made by each process program. It is assumed that, in the process program, the execution condition for each process and detailed operations of individual processes are defined. The process program can be created in any language such as the ladder language or the robot language. The data storage module 300 may store the time information, the collection data being generated, and the like.

[Process Execution Module]

The process execution module 301 executes a process based on the process program. The process execution module 301 executes the process program, to thereby determine whether or not the execution condition for the process is satisfied. The execution condition can be any condition, and is, for example, a condition that a predetermined variable reaches a predetermined value, a condition that a predetermined signal is received from the sensor, a condition that an object moves to a predetermined position, a condition that a predetermined time is reached, a condition that predetermined information is received from another industrial machine 30, or a condition that a predetermined instruction is received from the upper-level control apparatus 20. When the execution condition of a process is satisfied, the process execution module 301 executes this process.

[Generation Module]

The generation module 302 generates the collection data based on the collection settings. For example, the generation module 302 records the collection settings received from the upper-level control apparatus 20 in the data storage 300. The generation module 302 records the trigger received from the upper-level control apparatus 20 in the data storage 300. The generation module 302 determines whether or not the trigger is satisfied, and, when the trigger is satisfied, starts the generation of the collection data based on the collection settings. When the generation of the collection data is completed, the generation module 302 notifies the upper-level control apparatus 20 of the completion. When the upper-level control apparatus 20 requests the collection data, the generation module 302 transmits the collection data to the upper-level control apparatus 20. The generation module 302 is only required to generate the collection data based on an execution result of the process program, a date and time acquired through use of a real time clock, a timer, or the like, the signal from the sensor, or a combination thereof.

[1-4. Processing Executed by Data Collection System]

Figure 8:
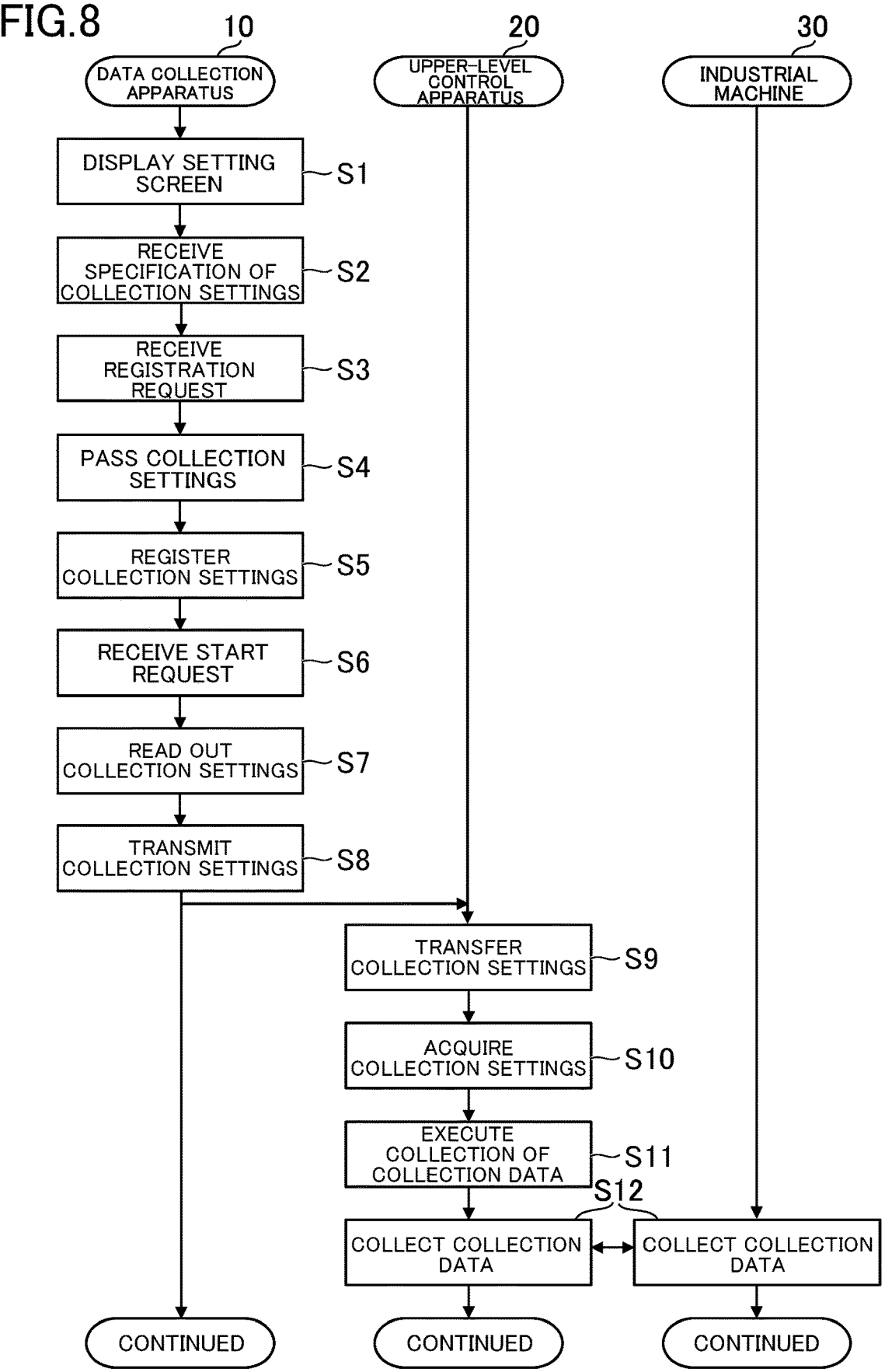
FIG. 8 is a flowchart for illustrating an example of processing executed in the data collection system according to the first embodiment.
Figure 9:
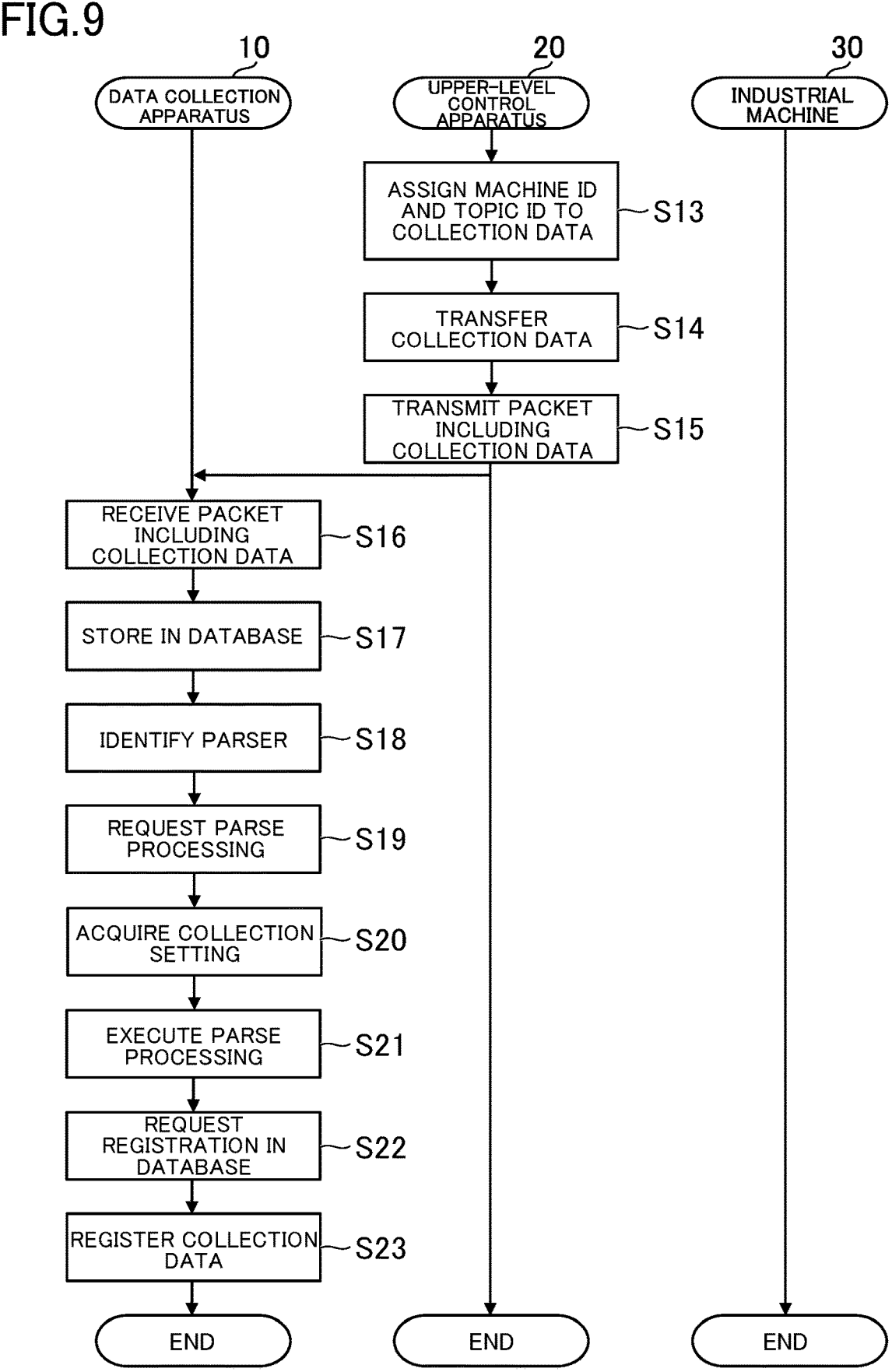
FIG. 9 is a flowchart for illustrating the example of the processing executed in the data collection system according to the first embodiment.

FIG. 8 and FIG. 9 are flowcharts for illustrating an example of processing executed in the data collection system according to the first embodiment. The processing illustrated in FIG. 8 and FIG. 9 is implemented by the CPUs 11, 21, and 31 and the IoT unit 24 executing the programs stored in the storages 12, 22, and 32 and the IoT unit 24, respectively. The processing illustrated in FIG. 8 and FIG. 9 is an example of processing executed by the functional blocks of FIG. 4, and is details of the flow of FIG. 2.

As illustrated in FIG. 8, the data collection apparatus 10 starts the setting tool stored in the storage 12 based on the operation from the operation interface 14, and displays the setting screen G on the display 15 (Step S1). The data collection apparatus 10 receives the specification of the collection settings by the user on the setting screen G (Step S2). In Step S2, the data collection apparatus 10 receives each of the specification of the industrial machine 30 in the input form F1 and the specification of the collection settings in the input form F2. The processing steps of Step S1 and Step S2 are details of Processing 1 illustrated in FIG. 2.

The data collection apparatus 10 receives the selection of the button B1 on the setting screen G, to thereby receive the registration request for the collection settings from the user (Step S3). The data collection apparatus 10 passes the collection settings specified on the setting screen G to the IoT module (Step S4). The IoT module registers the collection settings in the database DB (Step S5). The processing steps of Step S3 and Step S4 are details of Processing 2 illustrated in FIG. 2. The processing step of Step S5 is details of Processing 3 illustrated in FIG. 2.

The data collection apparatus 10 uses the IoT module to receive the selection of the button B2 on the setting screen G, to thereby receive the start request for the data collection from the user (Step S6). In Step S6, there is requested the start of the data collection based on the collection setting identified by the set of the machine ID and the topic ID specified on the setting screen G. The processing step of Step S6 is details of Processing 4 illustrated in FIG. 2.

The data collection apparatus 10 uses the IoT module to read out, from the database DB, the collection settings corresponding to the request for the start of the data collection (Step S7). In Step S7, from the database DB, the collection settings with which the set of the machine ID and the topic ID are associated are read out. The processing step of Step S7 is details of Processing 5 illustrated in FIG. 2.

The data collection apparatus 10 uses the IoT module to transmit the collection settings read out in Step S7 to the IoT unit 24 of the upper-level control apparatus 20 (Step S8). The IoT unit 24 of the upper-level control apparatus 20 transfers the collection settings received from the data collection apparatus 10 to the CPU 21 (Step S9). The CPU 21 of the upper-level control apparatus 20 records the collection settings in a memory inside the CPU 21 or the storage 22 (Step S10). The processing steps of Step S8 to Step S10 are details of Processing 6 illustrated in FIG. 2.

The CPU 21 of the upper-level control apparatus 20 uses the collection application to acquire the collection settings transferred in Step S9 (Step S10), and executes the collection of the collection data based on the acquired collection settings (Step S11). In Step S10, the collection settings stored in a register of the CPU 21 are acquired by the collection application. In Step S11, the collection application executes the reflection of the collection settings in the industrial machine 30, the start of the data collection in the industrial machine 30, the reflection of the trigger in the industrial machine 30, and the readout of the collection data from the industrial machine 30. The processing steps of Step S10 and Step S11 are details of Processing 7 illustrated in FIG. 2.

The CPU 21 of the upper-level control apparatus 20 uses the collection application to collect, from the industrial machine 30, the collection data based on the collection settings (Step S12). In Step S12, when the industrial machine 30 has completed the generation of the collection data, a predetermined variable of the industrial machine 30 changes to a predetermined value. When the upper-level control apparatus 20 detects the change of this variable to this value, the upper-level control apparatus 20 requests the industrial machine 30 to transmit the collection data. When the industrial machine 30 receives the request, the industrial machine 30 transmits the collection data to the upper-level control apparatus 20. It is assumed that the collection data is transmitted by the asynchronous communication, but may be transmitted by synchronous communication. The processing step of Step S12 is details of Processing 8 illustrated in FIG. 2.

With reference to FIG. 9, the CPU 21 of the upper-level control apparatus 20 assigns the machine ID and the topic ID to the collection data acquired from the industrial machine (Step S13), and transfers the collection data to the IoT unit 24 (Step S14). The IoT unit 24 of the upper-level control apparatus 20 stores the machine ID and the topic ID assigned in Step S13 in the header of a packet, and transmits this packet including the collection data to the data collection apparatus 10 (Step S15). The data collection apparatus 10 uses the IoT module to receive the packet including the collection data from the IoT unit 24 of the upper-level control apparatus 20 (Step S16). The processing steps of Step S13 to Step S16 are details of Processing 9 illustrated in FIG. 2.

The data collection apparatus 10 uses the IoT module to store the collection data included in the packet received from the upper-level control apparatus 20 in the database DB as collection data before the parse processing (Step S17). The data collection apparatus 10 uses the IoT module to identify a parser to which the parse processing for the received collection data is requested (Step S18). The data collection apparatus 10 uses the IoT module to request the parser identified in Step S18 to execute the parse processing for the collection data (Step S19). The processing steps of Step S17 to Step S19 are details of Processing 10 illustrated in FIG. 2.

The data collection apparatus 10 uses the parser to acquire the collection settings corresponding to the collection data based on the database DB (Step S20). In Step S20, the data collection apparatus 10 acquires the collection settings associated with the set of the machine ID and the topic ID stored in the header of the packet including the collection data. The processing step of Step S20 is details of Processing 11 illustrated in FIG. 2. The data collection apparatus 10 uses the parsers to execute the parse processing for the collection data based on the collection settings acquired in Step S20 (Step S21). The processing step of Step S21 is details of Processing 12 illustrated in FIG. 2.

The data collection apparatus 10 requests passing of the collection data after the parse processing from the parser to the IoT module, and the registration of the collection data after the parse processing in the database DB (Step S22). The IoT module registers the collection data after the parse processing in the database DB (Step S23). The processing steps of Step S22 and Step S23 are details of Processing 13 and Processing 14 illustrated in FIG. 2.

According to the data collection system 1 of the first embodiment, the collection settings are identified based on the set of the machine ID and the topic ID associated with the collection data, and the parse processing for the collection data is executed based on the identified collection settings, thereby being capable of achieving the parse processing corresponding to the collection settings of the collection data. For example, the collection data collected from the industrial machine 30 has the data structure corresponding to the collection settings, and there may thus be a case in which the collection data cannot directly be used for a predetermined purpose, for example, operation analysis. It is conceivable to execute the parse processing for the collection data to obtain data structure suitable for the predetermined purpose, but processing, for example, the data conversion by the parse processing, is required to correspond to the collection settings. Regarding this point, it is possible to identify specific parse processing based on the set of the machine ID and the topic ID associated with the collection data, and the parse processing corresponding to the collection settings of the collection data can thus be achieved. As a result, the collection data can be converted to the collection data having optimal data structure corresponding to the predetermined purpose, for example, the operation analysis, thereby being capable of increasing processing precision and increasing a processing speed for the predetermined purpose.

Moreover, the data collection system 1 identifies the collection settings based on the set of the machine ID and the topic ID associated with the collection data, thereby being capable of executing more flexible parse processing. For example, even when a plurality of industrial machines 30 from which the data is to be collected exist, it is possible to distinguish the individual industrial machines 30 based on the machine IDs, thereby being capable of executing the parse processing corresponding to the collection settings for the individual industrial machines 30. Moreover, for example, even when a plurality of collection settings exist for one certain industrial machine 30, the individual collection settings are distinguished from one another based on the topic IDs, thereby being capable of executing the parse processing corresponding to the individual collection settings.

Moreover, the data collection system 1 sets the machine ID based on the definition information on the control target of the upper-level control apparatus 20, thereby being capable of accurately setting the machine ID that can identify the industrial machine 30 specified as the control target of the upper-level control apparatus 20. As a result, for example, it is possible to prevent a case in which an industrial machine to which the collection data corresponds cannot be identified.

Moreover, the topic ID is the whole of or a part of the variable name that can identify the variable used by the application for collecting the collection data, and thus the data collection system 1 can use the topic ID to distinguish the variable used by the application. Accordingly, for example, it is possible to prevent a state in which a variable used by a certain application and a variable used by another application cannot be distinguished from each other, and appropriate collection settings cannot thus be executed.

Moreover, the data collection system 1 identifies at least one of a plurality of parsers based on the set of the machine ID and the topic ID associated with the collection data, and executes the parse processing based on the identified parser, thereby being capable of identifying the optimal parser for the parse processing to achieve accurate parse processing. For example, when one general-purpose parser is used for a plurality of industrial machines 30 and a plurality of collection settings, it is required to unify, to a certain degree, data structure among the plurality of industrial machines 30 and the plurality of collection settings, and the flexibility of the collection settings cannot be secured. However, the flexible collection settings can be achieved by preparing a plurality of parsers.

Moreover, the data collection system 1 receives the specification of the set of the machine ID and the topic ID and the collection settings by the user, thereby being capable of achieving the flexible data collection corresponding to the user.

Moreover, the data collection system 1 stores the set of the machine ID and the topic ID and the collection settings in the database DB in association with each other, and identifies the collection settings by using the database DB when the collection data is acquired. Consequently, management of the set of the machine ID and the topic ID and the collection settings is facilitated.

Moreover, the data collection system 1 acquires the collection data generated based on the control cycle of the industrial machine 30 different from the control cycle of the upper-level control apparatus 20, thereby being capable of achieving the parse processing corresponding to the collection settings for the industrial machine 30 even when the control cycle of the upper-level control apparatus 20 and the control cycle of the industrial machine 30 are different from each other.

Moreover, the data collection system 1 collects the collection data including the time information for each industrial machine 30, thereby being capable of executing the parse processing along the correct time axis.

Moreover, the data collection system 1 collects the collection data including the time information corresponding to the trigger, thereby being capable of acquiring the collection data along the time axis having the trigger as a reference.

Moreover, the data collection system 1 executes the parse processing for the collection data temporarily stored in the database DB, and stores the collection data for which the parse processing has been executed in the database DB or another database DB, thereby being capable of efficiently managing the collection data for which the parse processing has been executed.

2. Second Embodiment

In the first embodiment, description is given of the case in which the collection settings are fed back from the data collection apparatus 10 to the upper-level control apparatus 20, and the parse processing is executed in the data collection apparatus 10. In a second embodiment of the present disclosure, description is given of a case in which the feedback of the collection settings from the data collection apparatus 10 to the upper-level control apparatus 20 is not required, and the data collection is executed in the upper-level control apparatus 20. In the second embodiment, description of configurations equivalent to those in the first embodiment is omitted.

In the second embodiment, a main function relating to the data collection is implemented in the upper-level control apparatus 20, and hence, of the functions of FIG. 4, at least the collection setting identification module 106 and the execution module 107 are implemented by the upper-level control apparatus 20. Each of the collection setting identification module 106 and the execution module 107 in the second embodiment is implemented mainly by at least one of the CPU 21 or the IoT unit 24. Moreover, the collection module 202 may have the function equivalent to that of the collection module 104 of FIG. 4. Those points are the same in a third embodiment to a fifth embodiment of the present disclosure.

Figure 10:
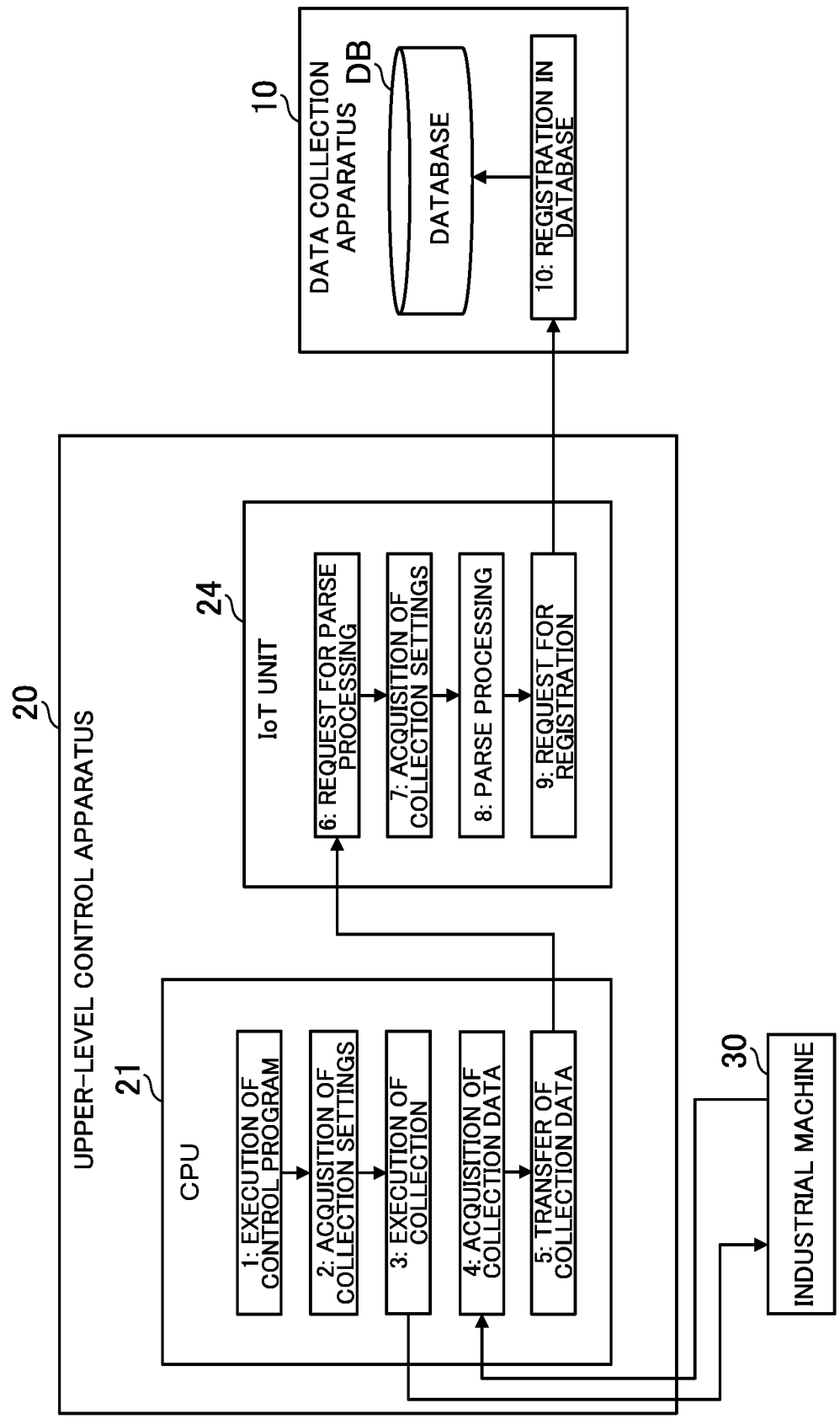
FIG. 10 is a diagram for illustrating an example of a flow of data collection in a data collection system according to a second embodiment of the present disclosure.

FIG. 10 is a diagram for illustrating an example of a flow of data collection in a data collection system 1 according to the second embodiment. As illustrated in FIG. 10, in the second embodiment, the data collection is executed in the flow different from the flow of Processing 1 to Processing 14 illustrated in FIG. 2 in the first embodiment.

In the second embodiment, it is assumed that collection settings specified in advance and various instructions for the data collection are included in the control program created in the ladder language or the like. That is, the collection settings are described in the ladder language or the like as a part of the control program. However, the collection settings may be external data to be referred to by the control program.

Instructions for the data collection corresponding to the function of the collection application described in the first embodiment are expressed in the ladder language or the like. For example, the control program includes an acquisition instruction for acquiring the collection settings in the control program, a collection setting instruction for setting the collection settings to the industrial machine 30, a start instruction for instructing the industrial machine 30 to start the collection, a trigger setting instruction for setting the trigger to the industrial machine 30, and a readout instruction for reading out the collection data from the industrial machine 30. The machine ID and the topic ID may be included in the control program, or may be stored in the upper-level control apparatus 20 as data different from the control program.

As illustrated in FIG. 10, the upper-level control apparatus 20 executes the control program, to thereby start the control for the industrial machine 30 (Processing 1). In the second embodiment, as a part of the control for the industrial machine 30, the collection data is collected from the industrial machine 30. For example, when the collection data is collected for the purpose of the traceability of an object, an instruction for the data collection is described at a timing around the end of each process for the object. The upper-level control apparatus 20 executes the acquisition instruction included in the control program, to thereby acquire the collection settings included in the control program (Processing 2).

The upper-level control apparatus 20 executes each of the collection setting instruction, the start instruction, the trigger setting instruction, and the readout instruction included in the control program, to thereby execute the data collection based on the acquired collection settings (Processing 3). Processing 3 of FIG. 10 is different from Processing 7 of FIG. 2 executed by the collection application in the first embodiment in a point that Processing 3 is executed by the control program. The other points are the same. Moreover, Processing 4 and Processing 5 of FIG. 10 are also different from Processing 8 and Processing 9 of FIG. 2 executed by the collection application in the first embodiment in a point that Processing 4 and Processing 5 are executed by the control program. The other points are the same. The point that the set of the machine ID and the topic ID is associated with the collection data when the collection data is transferred in Processing 5 is also the same.

In the second embodiment, the parser exists in the upper-level control apparatus 20. It is assumed that the parser is stored in the IoT unit 24, but may be stored in the storage 22. When the IoT unit 24 receives the collection data transferred from the CPU 21, the IoT unit 24 requests a module that internally holds the collection data to execute the parse processing (Processing 6). This module is a program that has a function equivalent to that of the IoT module described in the first embodiment, and is a program for executing the parse processing and the like for the collection data.

Processing 7 to Processing 9 of FIG. 10 executed after Processing 6 are different from Processing 10 to Processing 13 of FIG. 2 executed by the data collection apparatus 10 in the first embodiment in a point that Processing 7 to Processing 9 are executed by the IoT unit 24. The other points are the same. For example, in Processing 7, the IoT unit 24 requests the control program executed by the CPU 21 to acquire the collection settings. It is assumed that this request includes the set of the machine ID and the topic ID associated with the collection data being a target of the parse processing. The IoT unit 24 is only required to acquire the collection settings associated with this set from the control program, and to execute the parse processing in Processing 8. In Processing 9, the collection data after the parse processing is transmitted from the IoT unit 24 to the data collection apparatus 10. In Processing 10, the data collection apparatus 10 stores the collection data after the parse processing in the database DB.

In FIG. 10, description is given of the case in which the parse processing is executed by the IoT unit 24, but the parse processing may be executed by the CPU 21. In this case, a parser may be embedded in the control program, or an external parser may be invoked from the control program, to thereby execute the parse processing. It is only required that the CPU 21 transmit the collection data after the parse processing to the IoT unit 24, and the IoT unit 24 transfer the collection data after the parse processing to the data collection apparatus 10.

According to the data collection system 1 of the second embodiment, the collection settings are included in the control program executed by the upper-level control apparatus 20, and the parse processing is also executed on the upper-level control apparatus 20 side, thereby being capable of executing the main processing relating to the data collection on the upper-level control apparatus 20 side. Thus, even when the user does not particularly operate the data collection apparatus 10, the upper-level control apparatus 20 can collect the collection data to execute the parse processing, and acquire the collection data after the parse processing. In this case, the user is only required to manage the upper-level control apparatus 20 and the industrial machine 30, thereby being capable of reducing labor of the user.

3. Third Embodiment

In the second embodiment, description is given of the case in which the collection data after the parse processing is stored in the database DB of the data collection apparatus 10, but, in the third embodiment, description is given of a case in which the collection data after the parse processing is stored in the upper-level control apparatus 20. In the third embodiment, the data collection apparatus 10 may be omitted, and the data collection apparatus 10 may not be included in the data collection system 1. In the third embodiment, description of configurations equivalent to those in the first embodiment and the second embodiment is omitted.

Figure 11:
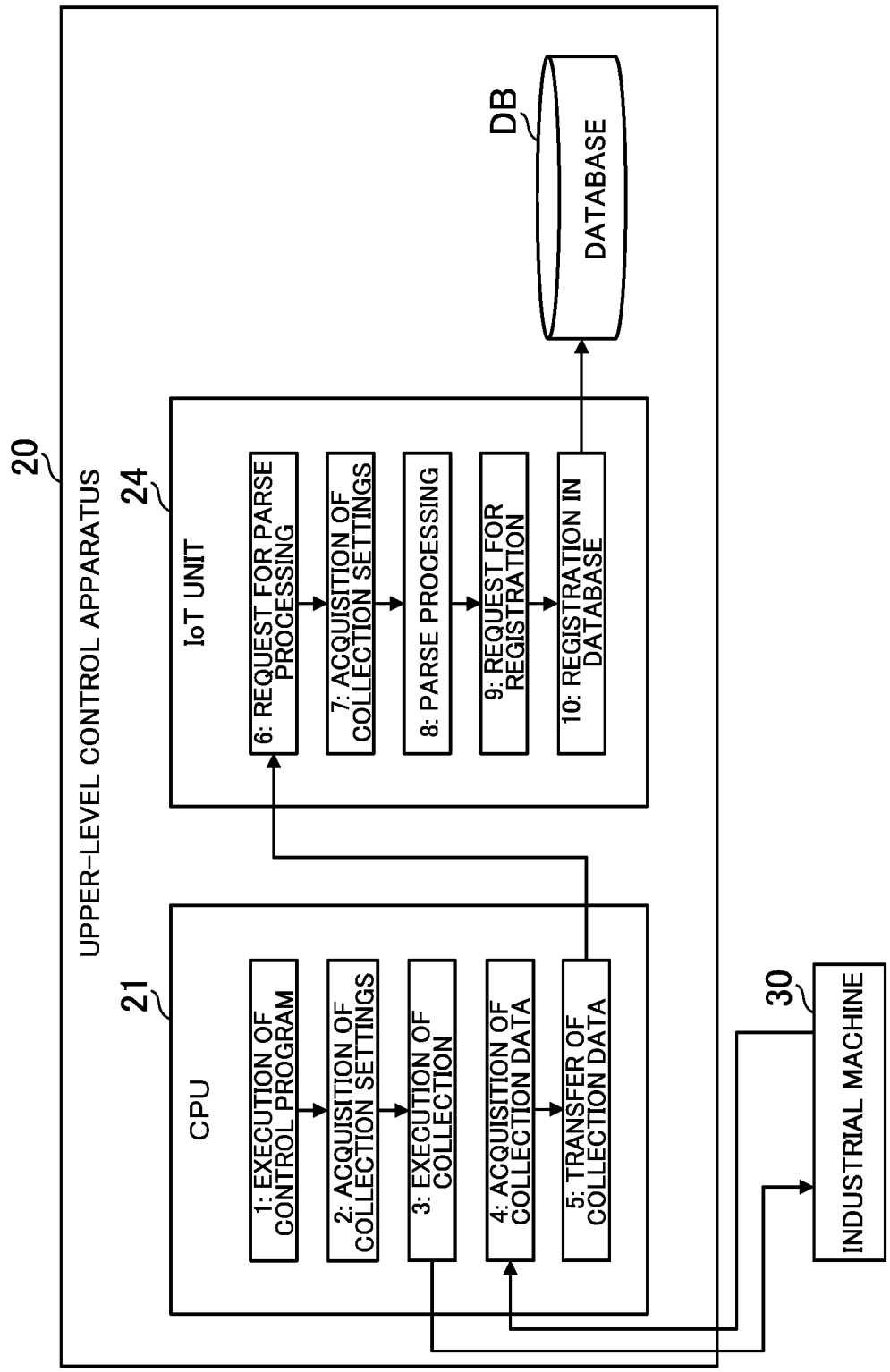
FIG. 11 is a diagram for illustrating an example of a flow of data collection in a data collection system according to a third embodiment of the present disclosure.

FIG. 11 is a diagram for illustrating an example of a flow of data collection in a data collection system 1 according to the third embodiment. As illustrated in FIG. 11, a rough flow of the data collection in the third embodiment is equivalent to that in the second embodiment, but is different in a point that Processing 10 is executed by the IoT unit 24. In Processing 10 of FIG. 11, the IoT unit 24 stores the collection data after the parse processing in the database DB included in the upper-level control apparatus 20.

It is assumed that the database DB is stored in the storage 22, but the database DB may be stored in the IoT unit 24, or when a nonvolatile memory is included in the CPU 21, the database DB may be stored in the CPU 21. Moreover, the database DB may be stored in an external information storage medium connected to the upper-level control apparatus 20, or may be stored in another computer (for example, a cloud server) different from the data collection apparatus 10.

Moreover, also in the third embodiment, similarly to the second embodiment, the parse processing may be executed by the CPU 21. In this case, the CPU 21 registers the collection data after the parse processing in the database DB. With this configuration, the upper-level control apparatus 20 does not transmit the data to an external computer, and the IoT unit 24 may thus be omitted. That is, the upper-level control apparatus 20 may not include the IoT unit 24, and may complete the data collection inside the upper-level control apparatus 20 itself.

According to the data collection system 1 of the third embodiment, the collection data after the parse processing can be stored in the database DB included in the upper-level control apparatus 20. Moreover, the data collection apparatus 10 can be omitted from the data collection system 1, and the user is not thus required to manage the data collection apparatus 10. Consequently, the labor of the user can be reduced.

4. Fourth Embodiment

In the first embodiment, description is given of the case in which the collection settings are specified from the data collection apparatus 10, and the collection start is instructed, but the specification of the collection settings and the instruction of the collection start may be executed from the HMI apparatus 25. In the fourth embodiment, description is given of the case in which the user specifies the collection settings from the HMI apparatus 25, and instructs the collection start. In the fourth embodiment, it is not required to include the collection settings in the control program as in the second embodiment and the third embodiment. The control program in the fourth embodiment may be equivalent to the control program in the first embodiment, and it is assumed in the fourth embodiment that the collection application described in the first embodiment is stored in the upper-level control apparatus 20. In the fourth embodiment, description of configurations equivalent to those in the first embodiment to the third embodiment is omitted.

Figure 12:
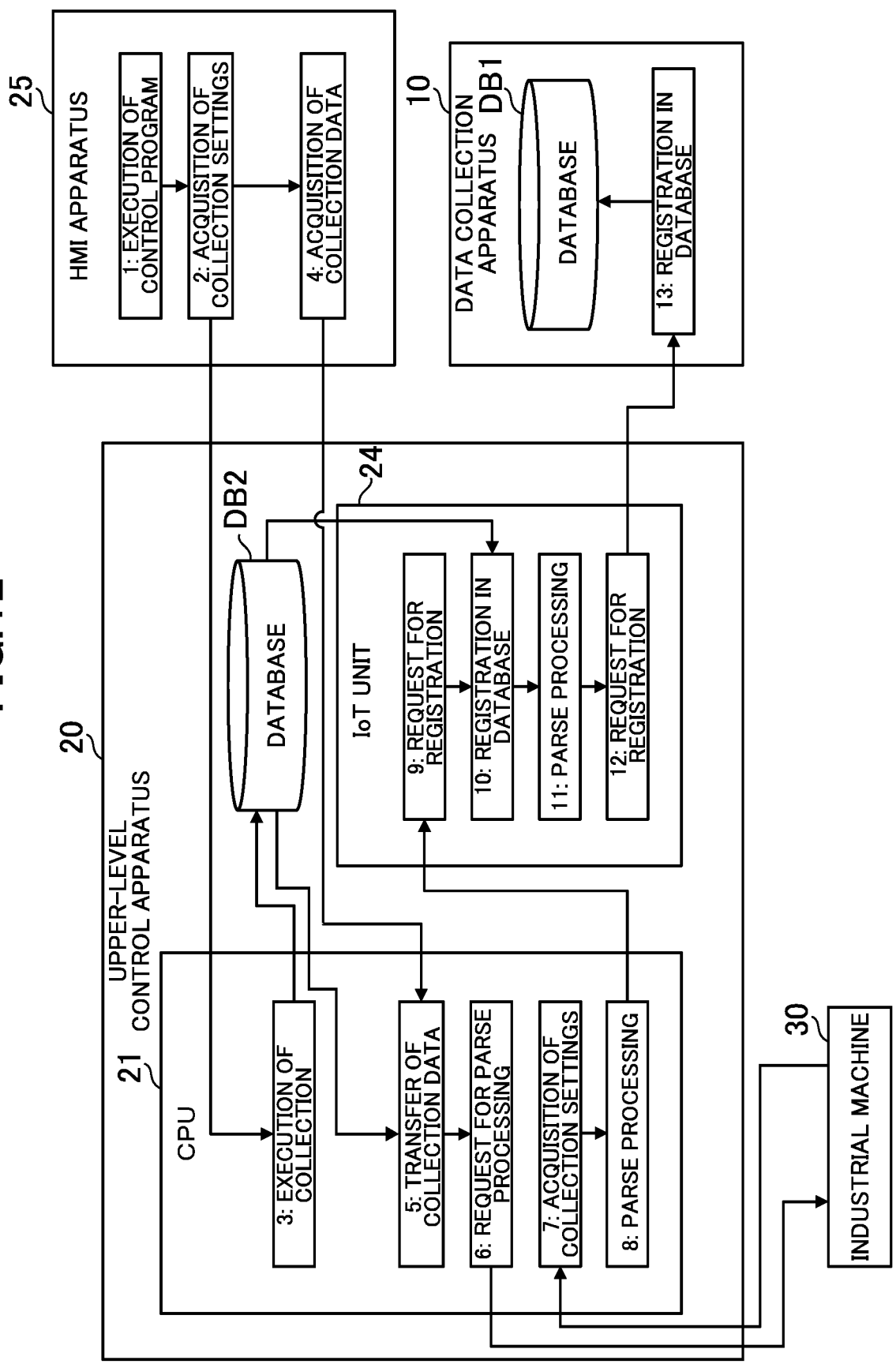
FIG. 12 is a diagram for illustrating an example of a flow of data collection in a data collection system according to a fourth embodiment of the present disclosure.

FIG. 12 is a diagram for illustrating an example of a flow of the data collection in the data collection system 1 according to the fourth embodiment. As illustrated in FIG. 12, in the fourth embodiment, Processing 1 equivalent to Processing 1 described with reference to FIG. 2 in the first embodiment is executed by the HMI apparatus 25. For example, the setting screen G equivalent to that of FIG. 3 is displayed on the HMI apparatus 25, and receives the specification of the collection settings by the user. The HMI apparatus 25 registers, together with the set of the machine ID and the topic ID, the collection settings specified by the user in the upper-level control apparatus 20 (Processing 2).

When the upper-level control apparatus 20 receives the collection settings specified by the user from the HMI apparatus 25, the upper-level control apparatus 20 stores, together with the set of the machine ID and the topic ID, the collection settings in the database DB2 stored by the upper-level control apparatus 20 itself (Processing 3). The database DB2 is equivalent to a portion of the database DB in the first embodiment that stores the set of the machine ID and the topic ID and the collection settings. It is assumed that the database DB2 is stored in the storage 22, but the database DB2 may be stored in a nonvolatile memory included in the CPU 21, the IoT unit 24, an external storage medium, or another computer. The HMI apparatus 25 receives the instruction of the collection start from the user (Processing 4). It is assumed that the instruction of the collection start includes the set of the machine ID and the topic ID of the collection settings being the target of the collection.

When the upper-level control apparatus 20 receives a notification that the user has instructed the collection start from the HMI apparatus 25, the upper-level control apparatus 20 acquires, from the database DB2, the collection settings associated with the set of the machine ID and the topic ID included in the instruction of the collection start (Processing 5). The following Processing 6 to Processing 13 of FIG. 12 are equivalent to Processing 3 to Processing 10 of FIG. 10. However, Processing 3 to Processing 5 of FIG. 10 are executed mainly by the control program, but Processing 6 to Processing 8 of FIG. 12 are executed mainly by the collection application. Moreover, the collection settings are acquired from the control program in Processing 7 of FIG. 10, but the collection settings are acquired from the database DB2 in Processing 10 of FIG. 12. The database DB1 is equivalent to a portion of the database DB in the first embodiment that stores the collection data after the parse processing. Moreover, also in the fourth embodiment, similarly to the second embodiment, the parse processing may be executed by the CPU 21.

According to the data collection system 1 of the fourth embodiment, even when the user does not operate the data collection apparatus 10, but the user specifies the collection settings from the HMI apparatus 25, the upper-level control apparatus 20 collects the collection data, and executes the parse processing, thereby being capable of acquiring the collection data after the parse processing. In this case, the user is only required to operate the HMI apparatus 25 familiar to the user, and the labor of the user can thus be reduced.

5. Fifth Embodiment

In the fourth embodiment, description is given of the case in which the collection data after the parse processing is stored in the database DB1 of the data collection apparatus 10, but, in the fifth embodiment, description is given of a case in which the collection data after the parse processing is stored in the upper-level control apparatus 20. In the fifth embodiment, the data collection apparatus 10 may be omitted, and the data collection apparatus 10 may not be included in the data collection system 1. In the fifth embodiment, description of configurations equivalent to those in the first embodiment to the fourth embodiment is omitted.

Figure 13:
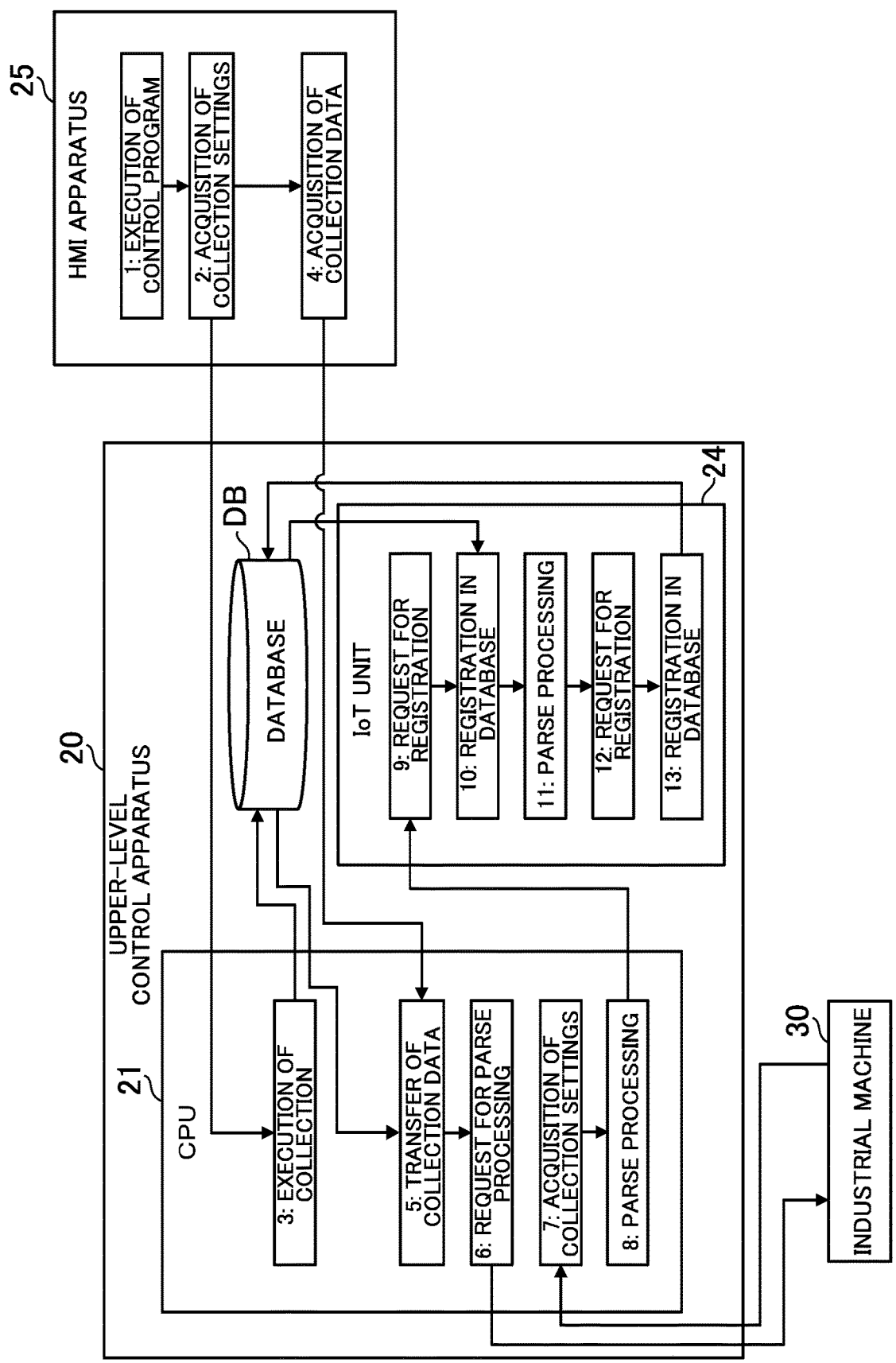
FIG. 13 is a diagram for illustrating an example of a flow of data collection in a data collection system according to a fifth embodiment of the present disclosure.

FIG. 13 is a diagram for illustrating an example of a flow of data collection in a data collection system 1 according to the fifth embodiment. As illustrated in FIG. 13, a rough flow of the data collection in the fifth embodiment is equivalent to that in the fourth embodiment, but is different in a point that Processing 13 is executed by the IoT unit 24. In Processing 10 of FIG. 13, the IoT unit 24 stores the collection data after the parse processing in the database DB included in the upper-level control apparatus 20. The database DB of FIG. 13 is formed by combining the database DB1 and the database DB2 of FIG. 12, and stores also the collection settings.

Moreover, also in the fifth embodiment, similarly to the fourth embodiment, the parse processing may be executed by the CPU 21. In this case, the CPU 21 registers the collection data after the parse processing in the database DB. With this configuration, the upper-level control apparatus 20 does not transmit the data to an external computer, and the IoT unit 24 may thus be omitted. That is, the upper-level control apparatus 20 may not include the IoT unit 24, and may complete the data collection inside the upper-level control apparatus 20 itself.

According to the data collection system 1 of the fifth embodiment, the collection data after the parse processing can be stored in the database DB included in the upper-level control apparatus 20. Moreover, the data collection apparatus 10 can be omitted from the data collection system 1, and thus the user is not required to manage the data collection apparatus 10. Consequently, the labor of the user can be reduced.

6. Modification Example

The present disclosure is not limited to the above-mentioned embodiments. The present disclosure may appropriately be modified without departing from the purport of the present disclosure.

Figure 14:
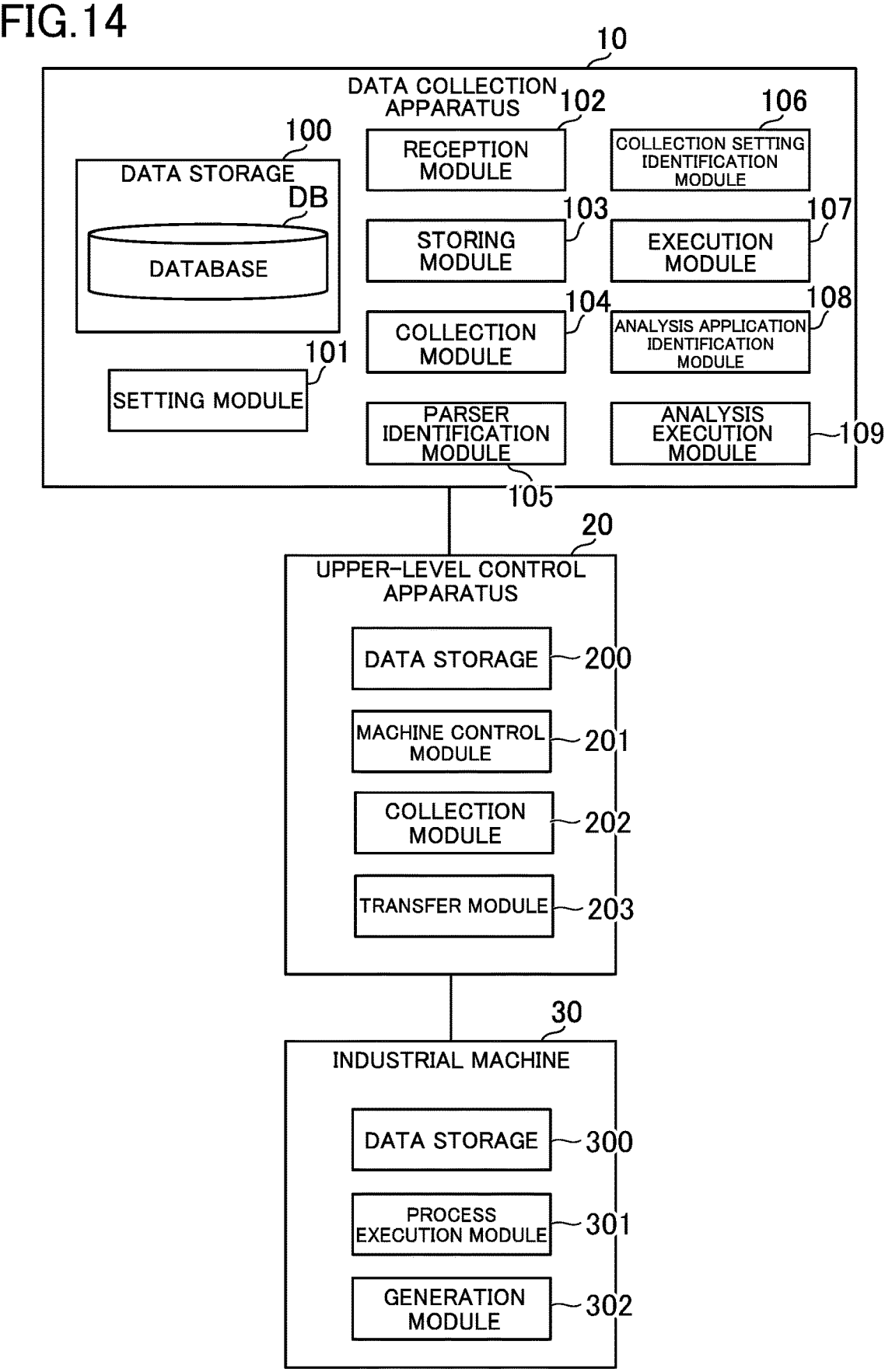
FIG. 14 is a functional block diagram in a modification example of the present disclosure.

FIG. 14 is a functional block diagram in a modification example of the present disclosure. As illustrated in FIG. 14, an analysis application identification module 108 and an analysis execution module 109 are implemented in the modification example described below. Those modules are implemented mainly by the CPU 11. In FIG. 14, description is given based on the first embodiment, but the modification example described below can be applied also to the second embodiment to the fifth embodiment.

The analysis application identification module 108 identifies an analysis application relating to analysis of the collection data from among a plurality of analysis applications. The analysis application is an application for analyzing the collection data after the parse processing. The parse processing is executed in order to convert the collection data to data having data structure that can be input to the analysis application. The analysis application is created by the user. When the collection data is input to the analysis application, the analysis application analyzes contents thereof, and outputs an analysis result. The analysis result may be occurrence of an abnormality or quality of an object.

The data storage 100 in this modification example stores the plurality of analysis applications. For example, in the database DB, analysis applications corresponding to the individual collection settings may be defined. That is, an analysis application to which collection data collected based on certain collection settings is to be input may be defined in the database DB. When the parse processing for certain collection data is executed, the analysis application identification module 108 identifies, as an analysis application relating to this collection data, an analysis application associated with the collection settings for this collection data. This identification may be executed by the parser. That is, the processing by the analysis application identification module 108 may be a part of the processing executed by the parser.

The analysis execution module 109 causes the identified analysis application to analyze the collection data for which the parse processing has been executed. The analysis execution module 109 inputs the collection data for which the parse processing has been executed to the analysis application, and acquires the analysis result output from the analysis application. This analysis result may be stored in the database DB, or may be displayed on the display 15. Moreover, for example, this analysis result may be output to another computer other than the data collection apparatus 10 or an external information storage medium. The analysis execution module 109 may cause the analysis application to analyze the entire collection data, or may cause the analysis application to analyze only a part of the collection data. When the analysis application analyzes only a part of the collection data, the analysis application may analyze only collection data collected when an alarm occurred, collection data collected at time around the time at which the alarm occurred, or collection data including a predetermined value.

According to the above-mentioned modification example, the analysis application corresponding to the analysis of the collection data is identified from among the plurality of analysis applications, and the identified analysis application analyzes the collection data for which the parse processing has been executed, thereby being capable of achieving quick analysis.

Moreover, for example, the topic ID may not particularly be used for the variable name of the variable for the feedback. Moreover, for example, only one general-purpose parser may exist, and, in this case, the identification of the parser may not be executed. Moreover, for example, the correspondence between the set of the machine ID and the topic ID and the collection settings may not be stored in the database DB, and may be stored in another storage area. Moreover, for example, the collection data may not be associated with the time information of each industrial machine 30, but may be associated with the time information of the upper-level control apparatus 20 or the time information of the data collection apparatus 10. Moreover, for example, the parser and the IoT module may be registered in the data collection apparatus 10 through installation of an add-on program. Moreover, for example, a state of the data collection in progress may be displayed on the setting screen G.

Moreover, for example, each function described above is only required to be implemented in any apparatus included in the data collection system 1. For example, the functions described as being implemented in the data collection apparatus 10 may be implemented in the upper-level control apparatus 20 or the industrial machine 30. Moreover, for example, the functions described as being implemented in the upper-level control apparatus 20 may be implemented in the data collection apparatus 10 or the industrial machine 30. Moreover, for example, each of the functions may not be distributed to a plurality of apparatus, but may be implemented by one apparatus.

The invention claimed is:

1. A data collection system comprising:
   a data collection apparatus, and
   an upper-level control apparatus configured to control an industrial machine,
   wherein the upper-level control apparatus is configured to:
   collect collection data relating to the industrial machine based on a predetermined collection setting; and
   transfer the collection data and identification information that includes first identification information for identifying the industrial machine and second identification information different from the first identification information to the data collection apparatus, wherein a set of the first identification information and the second identification information identify the predetermined collection setting and a parser;
   wherein the data collection apparatus configured to:
   store the first identification information, the second identification information, the predetermined collection setting, and the parser;
   identify the predetermined collection setting based on the transferred first identification information and the transferred second identification information;
   identify based on the transferred first identification information and the transferred second identification information; and
   execute parse processing relating to the collection data based on the identified predetermined collection setting and the identified parser.

2. The data collection system according to claim 1, wherein the industrial machine is configured to be controlled by the upper-level control apparatus, and wherein the data collection system is configured to set the first identification information based on definition information relating to a control target of the upper-level control apparatus.

3. The data collection system according to claim 1, wherein the second identification information is a part or whole of variable identification information for identifying a variable used by a collection application relating to the collection data,
wherein the collection application is configured to execute processing relating to the collection of the collection data corresponding to the predetermined collection setting based on the variable, and
wherein the data collection system is configured to collect the collection data based on the processing executed by the collection application.

4. The data collection system according to claim 1, wherein the data collection system is configured to:
receive specification of the identification information and the predetermined collection setting by a user, and
identify the predetermined collection setting specified by the user based on the identification information which is associated with the collection data, and is specified by the user.

5. The data collection system according to claim 1, wherein the data collection system is configured to:
store the identification information and the predetermined collection setting in a database in association with each other, and
identify the predetermined collection setting based on the database and the identification information associated with the collection data.

6. The data collection system according to claim 1, wherein the industrial machine is configured to be controlled by the upper-level control apparatus,
wherein a control cycle of the upper-level control apparatus and a control cycle of the industrial machine are different from each other, and
wherein the data collection system is configured to collect the collection data generated based on the control cycle of the industrial machine different from the control cycle of the upper-level control apparatus through the upper-level control apparatus.

7. The data collection system according to claim 1, wherein:
the data collection system comprises al machines that includes the industrial machine, and
the data collection system is configured to collect the collection data including time information for each industrial machine.

8. The data collection system according to claim 1, wherein the industrial machine is configured to collect the collection data based on a predetermined trigger, and
wherein the data collection system is configured to collect the collection data including time information corresponding to the predetermined trigger.

9. The data collection system according to claim 1, wherein the data collection system is configured to:
collect the collection data to store the collection data in a database, and
execute the parse processing for the collection data stored in the database, and to store the collection data for which the parse processing has been executed in one of the database or another database.

10. The data collection system according to claim 1, wherein the data collection is configured to:
identify an analysis application relating to analysis of the collection data from among a plurality of analysis applications; and
cause the identified analysis application to analyze the collection data for which the parse processing has been executed.

11. A data collection method, comprising:
collecting, by an upper-level control configured col an industrial machine, collection data relating to the industrial machine based on a predetermined collection setting;
transferring, by the upper-level control apparatus, the collection data and identification information that includes first identification information for identifying the industrial machine and second identification information from the first identification information to a data collection apparatus, a set of the first identification and the second identification information identify the predetermined collection setting and a parser,
storing, by the data collection apparatus, a database that stores the first identification information, the second identification information, the predetermined collection setting, and the parser,
identifying, by the data collection apparatus, the predetermined collection setting based on the transferred first identification information and the transferred second identification information;
identifying, by the data collection apparatus, the parser based on the transferred first identification information and the transferred second identification information; and
executing, by the data collection apparatus, the parser based on the transferred first data based on the identified predetermined collection setting and the identified parser.

12. A non-transitory computer readable information storage medium storing a program that causes a data collection apparatus to communicate with an upper-level control apparatus configured to control an industrial machine,
wherein the upper-level control apparatus is configured to:
collect collection data relating to the industrial machine based on a predetermined collection setting; and
transfer the collection data and identification information that includes first identification information for identifying the industrial machine and second identification information different from the first identification information to the data collection apparatus, wherein a set of the first identification information and the second identification information identify the predetermined collection setting and a parser;
wherein the data collection apparatus stores the first identification information, the second identification information, the predetermined collection setting, and the parser; and
wherein the program causes the data collection apparatus to:
identify a predetermined collection setting based on the transferred first identification information and the transferred second identification information;
identify the parser based on the transferred first identification information and the transferred second identification information; and
execute parse processing relating to the collection data based on the identified predetermined collection setting and the identified parser.

13. The data collection system according to claim 2,
- wherein the second identification information is a part or whole of variable identification information for identifying a variable used by a collection application relating to the collection data,
- wherein the collection application is configured to execute processing relating to the collection of the collection data corresponding to the predetermined collection setting based on the variable, and
- wherein the data collection system is configured to collect the collection data based on the processing executed by the collection application.

14. The data collection system according to claim 2, wherein the data collection system is configured to:
- identify at least one parser from among a plurality of parsers based on the identification information associated with the collection data, and
- execute the parse processing based on the identified predetermined collection setting and the identified at least one parser.

15. The data collection system according to claim 2, wherein the data collection on system is configured to:
- identify at least one parser from among a plurality of parsers based on the identification information associated with the collection data, and
- execute the parse processing based on the identified predetermined collection setting and the identified at least one parser.

* * * * *